United States Patent
Mortensen et al.

(10) Patent No.: US 10,613,205 B2
(45) Date of Patent: Apr. 7, 2020

(54) SYSTEMS AND METHODS FOR ULTRASOUND BEAMFORMING

(71) Applicant: ANALOG DEVICES, INC., Norwood, MA (US)

(72) Inventors: Mikael Mortensen, Cambridge, MA (US); Eric G. Nestler, Long Beach Township, NJ (US); J. Brian Harrington, Chelmsford, MA (US); Jeffrey G. Bernstein, Middleton, MA (US)

(73) Assignee: ANALOG DEVICES, INC., Norwood, MA (US)

(*) Notice: Subject to any disclaimer, the term of this patent is extended or adjusted under 35 U.S.C. 154(b) by 291 days.

(21) Appl. No.: 14/875,022

(22) Filed: Oct. 5, 2015

(65) Prior Publication Data
US 2016/0097846 A1 Apr. 7, 2016

Related U.S. Application Data

(60) Provisional application No. 62/060,517, filed on Oct. 6, 2014.

(51) Int. Cl.
*G01S 7/52* (2006.01)
*G01S 15/89* (2006.01)
*G10K 11/34* (2006.01)

(52) U.S. Cl.
CPC ...... *G01S 7/52017* (2013.01); *G01S 7/52034* (2013.01); *G01S 15/8915* (2013.01); *G10K 11/346* (2013.01); *G01S 7/5208* (2013.01)

(58) Field of Classification Search
None
See application file for complete search history.

(56) References Cited

U.S. PATENT DOCUMENTS

| | | | |
|---|---|---|---|
| 4,155,258 | A | 5/1979 | Engeler et al. |
| 4,387,597 | A | 1/1983 | Brandestini |

(Continued)

FOREIGN PATENT DOCUMENTS

| | | |
|---|---|---|
| EP | 1956707 | 2/2007 |
| JP | 2006-501005 | 1/2006 |

(Continued)

OTHER PUBLICATIONS

Ji-Yong a Single-Chip Time-Interleaved 32-Channel Analog Beamformer for Ultrasound Medical Imaging, IEE Asian Solid-State Circuits Conference, Nov. 12-14, 2012, pp. 193-196 . (Year: 2012).*

(Continued)

*Primary Examiner* — Hovhannes Baghdasaryan
(74) *Attorney, Agent, or Firm* — Patent Capital Group

(57) ABSTRACT

A system for ultrasound beamforming is provided, including a sampled analog beamformer, an array of ultrasound transducers, and a high voltage amplifier coupled to the sampled analog beamformer and the array of ultrasound transducers. The sampled analog beamformer includes a sampled analog filter for filtering an incoming analog signal and adding a fractional delay, and transmitting a filtered analog ultrasound signal. The array of ultrasound transducers further transmits the filtered analog ultrasound signal. The high voltage amplifier drives transducers in the array of ultrasound transducers.

22 Claims, 16 Drawing Sheets

(56) References Cited

U.S. PATENT DOCUMENTS

| | | |
|---|---|---|
| 4,470,303 A | 9/1984 | O'Donnell |
| 4,662,223 A | 5/1987 | Riley et al. |
| 4,669,314 A | 6/1987 | Magrane |
| 4,700,573 A | 10/1987 | Savord |
| 4,920,521 A | 4/1990 | Yoshie |
| 5,191,546 A | 3/1993 | Green |
| 5,203,335 A | 4/1993 | Noujaim et al. |
| 5,284,044 A | 2/1994 | Bier |
| 5,345,426 A | 9/1994 | Lipschutz |
| 5,396,285 A * | 3/1995 | Hedberg ............ G06T 5/20 348/163 |
| 5,522,391 A | 6/1996 | Beaudin et al. |
| 5,555,534 A | 9/1996 | Maslak et al. |
| 5,590,658 A | 1/1997 | Chiang et al. |
| 5,667,373 A | 9/1997 | Wright et al. |
| 5,675,554 A | 10/1997 | Cole et al. |
| 5,685,308 A | 11/1997 | Wright et al. |
| 5,997,479 A | 12/1999 | Savord et al. |
| 6,123,671 A | 9/2000 | Miller |
| 6,135,961 A | 10/2000 | Pflugrath et al. |
| 6,212,131 B1 | 4/2001 | Oppelt et al. |
| 6,248,071 B1 | 6/2001 | Lin |
| 6,380,766 B2 | 4/2002 | Savord |
| 6,491,634 B1 | 12/2002 | Leavitt et al. |
| 6,624,783 B1 * | 9/2003 | Rabideau ............ G01S 7/292 342/128 |
| 6,705,995 B1 | 3/2004 | Poland et al. |
| 7,115,093 B2 | 10/2006 | Halmann et al. |
| 7,297,118 B2 | 11/2007 | Kristoffersen |
| 7,527,591 B2 | 5/2009 | Haugen et al. |
| 7,527,592 B2 | 5/2009 | Haugen et al. |
| 7,583,214 B2 | 9/2009 | Liu et al. |
| 7,611,463 B2 | 11/2009 | Shah |
| 7,687,976 B2 | 3/2010 | Haider et al. |
| 7,693,551 B2 | 4/2010 | Ojard |
| 7,952,260 B2 | 5/2011 | Haider et al. |
| 8,002,708 B2 | 8/2011 | Shah et al. |
| 8,248,885 B2 | 8/2012 | Ma et al. |
| 9,767,818 B1 * | 9/2017 | Jain ............ G10L 21/0208 |
| 2001/0043090 A1 | 11/2001 | Savord |
| 2005/0068221 A1 | 3/2005 | Freeman et al. |
| 2005/0131299 A1 | 6/2005 | Robinson et al. |
| 2007/0016022 A1 | 1/2007 | Blalock et al. |
| 2007/0078347 A1 | 4/2007 | Srinivasan et al. |
| 2008/0262351 A1 | 10/2008 | Scampini |
| 2013/0226001 A1 | 8/2013 | Steen et al. |
| 2013/0336560 A1 | 12/2013 | Wong |
| 2014/0126323 A1 | 5/2014 | Li et al. |
| 2014/0243676 A1 | 8/2014 | Cogan et al. |
| 2014/0254307 A1 | 9/2014 | Zhao et al. |

FOREIGN PATENT DOCUMENTS

| | | |
|---|---|---|
| JP | 2006-051368 | 2/2006 |
| JP | 2008-070404 | 3/2008 |
| JP | 2008-0514335 | 10/2008 |
| JP | 2010-124066 | 6/2010 |

OTHER PUBLICATIONS

Vijay "Analog Beamforming in MIMO Communications with phase shift networks and online channel estimations", IEEE Transaction on signal processing, vol. 58, No. 8, Aug. 2010, pp. 4131-4143 (Year: 2010).*

Cheng-Han Chan et al., *A New Method for Least-Squares and Minimax Group-Delay Error Design of Allpass Variable Fractional-Delay Digital Filters*, Hindawi Publishing Corporation, EURASIP Journal on Advances in Signal Processing, vol. 2010, Article ID 976913, 10 pages.

Sverre Holm et al., *Analysis of Worst-Case Phase Quantization Sidelobes in Focused Beamforming*, IEEE Transactions on Ultrasonics, Ferroelectrics and Frequency Controls, vol. 39, No. 5, Sep. 1992, 7 pages.

H.T. Feldkämper et al., *Low Power Delay Calculation for Digital Beamforming in Handheld Ultrasound Systems*, 2000 IEEE Ultrasonics Symposium © 2000 IEEE, 4 pages.

Douglas A. Gray, *Effect of Time Delay Errors on the Beam Pattern of a Linear Array*, IEEE Journal of Oceanic Engineering, vol. OE-10, No. 3, Jul. 1985, 9 pages.

Ronald A. Mucci, *A Comparison of Efficient Beamforming Algorithms*, IEEE Transactions on Acoustics, Speech and Signal Processing, vol. ASSP-32, No. 3, Jun. 1984, 11 pages.

William L. Beaver, *Phase Error Effects in Phased Array Beam Steering*, 1977 Ultrasonics Symposium Proceedings, IEEE Cat. #77CH1264-TSU, 4 pages.

Paul A. Magnin et al., *Delay Quantization Error in Phased Array Images*, IEEE Transactions on Sonics and Ultrasonics, vol. SU-28, No. 5, Sep. 1981, 6 pages.

Chang-Hong Hu et al., *Development of a Real-Time, High-Frequency Ultrasound Digital Beamformer for High-Frequency Linear Array Transducers*, IEEE Transactions on Ultrasonics, Ferroelectronics and Frequency Control, vol. 53, No. 2, Feb. 2006, 7 pages.

R.A. Mucci et al., *Constrained Least-Squares Synthesis of Coefficients for Arrays of Sensors and FIR Digital Filters*, IEEE Transactions on Aerospace and Electronic Systems, vol. AES-12, No. 2, Mar. 1976, 8 pages.

Svetoslav I. Nikolov et al., *Parametric Beamformer for Synthetic Aperture Ultrasound Imaging*, © 2006 IEEE Ultrasonics Symposium, 5 pages.

Vesa Välimäki et al., *Fractional Delay Filter Design Based on Truncated Lagrange Interpolation*, IEEE Signal Processing Letters, vol. 14, No. 11, Nov. 2007, 4 pages.

Svetoslav Ivanov Nikolov et al., *Fast Parametric Beamformer for Synthetic Aperature Imaging*, IEEE Transactions on Ultrasonics, Ferroelectrics and Frequency Control, vol. 55, No. 8, Aug. 2008, 13 pages.

Zhanxiang Zhao et al., *Pipelines High Precision Beamforming Delay Calculator for Ultrasound Imaging*, © 2011 IEEE 978-1-4577-1740-6/11, 4 pages.

Gi-Duck Kim et al., *A Single FPGA-Based Portable Ultrasound Imaging System for Point-of-Care Applications*, IEEE Transactions on Ultrsonics, Ferroelectrics and Frequency Control, vol. 59, No. 7, Jul. 2012, 9 pages.

Borislav Gerogiev Tomov et al., *Scalable Intersample Interpolation Architecture for High-channel-count Beamformers*, © 2011 IEEE International Ultrasonics Symposium Proceedings, 4 pages.

Hai Huyen Dam, *Variable Fractional Delay FIR Filter Design with a Bicriteria and Coefficient Relationship*, IEEE Transactions on Circuits and Systems—II: Express Briefs, vol. 61, No. 1, Jan. 2014, 5 pages.

Mohamed Almekkawy et al., *An Optimized Ultrasound Digital Beamformer with Dynamic Focusing Implemented on FPGA*, © 2014 IEEE, 978-1-4244-7929-0/14, 4 pages.

T. Siritan et al., *Enhanced Pseudo-Dynamic Receive Beamforming Using Focusing Delay Error Compensation*, The 2014 Biomedical Engineering International Conference (BMEiCON-2014), © 2014 IEEE, 978-1-4799-6801-5/14, 4 pages.

Mattias Olsson et al., *Time-Delay Estimation Using Farrow-Based Fractional-Delay Fir Filters: Filter Approximation vs. Estimation Errors*, 14th European Signal Processing Conference (EUSIPCO 2006), Florence, Italy, Sep. 4-8, 2006 © EURASIP, 5 pages.

Y. Arai et al., *TMC—A CMOS Time to Digital Converter VLSI*, IEEE Transactions on Nuclear Science, vol. 36, No. 1, Feb. 1989, © 1989 IEEE, 0018-9499/89/0200-0528, 4 pages.

Kamlesh Kumar Singh et al., *Improved Fractional Digital Delay Filter*, International Journal of Electronics Engineering, 3 (1), 2011, pp. 81-84 (5 pages).

Jeremy A. Brown et al., *A Low-Cost, High-Performance Pulse Generator for Ultrasound Imaging*, IEEE Transactions on Ultrasonics, Ferroelectrics and Frequency Control, vol. 49, No. 6, Jun. 2002, © 2002 IEEE, 0885-3010, 4 pages.

Borislav Gueorguiev Tomov, *Compact Beamforming in Medical Ultrasound Scanners*, Jan. 31, 2003, Technical University of Denmark, 149 pages.

(56) References Cited

OTHER PUBLICATIONS

Masaaki Nahahara et al., *Optimal Design of Fractional Delay Filters*, Proceedings of the 42$^{nd}$ IEEE Conference on Decision and Control, Maui, Hawaii USA, Dec. 2003, 6 pages.
S.R.K. Dutta et al., *New Algorithms for Constrained Minimax Optimization*, Mathematical Programming 13 (1977) 140-155, North-Holland Publishing Company, 16 pages.
Vesa Välimäki, *Simple Design of Fractional Delay Allpass Filters*, Helsinki University of Technology, Laboratory of Acoustics and Audio Signal Processing, Espoo, Finland, 4 pages.
C.W. Farrow, *A Continuously Variable Digital Delay Element*, ISCAS'88 CH2458-8/88/0000-2641 © 1988 IEEE, 5 pages.
Mostafa Fatermi et al., *Ultrasonic B-Scan Imaging: Theory of Image Formation and a Technique for Restoriation1*, Ultrasonic Imaging and Tissue Characterization Symposium, Jan. 1, 1980, 40 pages.
H.T. Feldkämper et al., *Low Power Delay Calculation for Digital Beamforming in Handheld Ultrasound Systems*, © 2000 IEEE Ultrasonics Symposium, 0-7803-6365-5/00, 4 pages.
V.S. Gierenz et al., *A Low Power Digital Beamformer for Handheld Ultrasound Systems*, Chair of Electrical Engineering and Computer Systems, University of Technology RWTH Aachen, Germany, 4 pages.
Drake A. Guenther et al., *Optimal Apodization Design for Medical Ultrasound Using Constrained Least Squares Part I: Theory*, IEEE Transactions on Ultrasonics, Ferrorelectrics and Frequency Control, vol. 54, No. 2, Feb. 2007, 11 pages.
Drake A. Guenther et al., *Optimal Apodization Design for Medical Ultrasound Using Constrained Least Squares Part II: Simulation Results*, IEEE Transactions on Ultrasonics, Ferrorelectrics and Frequency Control, vol. 54, No. 2, Feb. 2007, 16 pages.
Bruno Haider, *Power Drive Circuits for Diagnostic Medical Ultrasound*, Proceedings of the 18$^{th}$ International Symposium on Power Semiconductor Devices & IC's, Jun. 4-8, 2006, Naples, Italy, 8 pages.
Fredric J. Harris, *On the Use of Windows for Harmonic Analysis with the Discrete Fourier Transform*, Proceedings of the IEEE, vol. 66, No. 1, Jan. 1978, 33 pages.
Fredric J. Harris, *Performance and Design of Farrow Filter Used for Arbitrary Resampling*, © 1997 IEEE, 0-7803-4137-6/97, 5 pages.
J.V. Hatfield et al., *Transmit and Receive ASICs for an Ultrasound Imaging Multi-Element Array Transducer*, © 1994 The Institute of Electrical Engineers, 5 pages.
C. Henning et al., *A Low Power Reconfigurable 12-tap FIR Interpolation Filter with Fixed Coefficient Sets*, Chair of Electrical Engineering and Computer Systems, University of Technology, RWTH Aachen, Germany, 4 pages.
Ewa Hermanowicz et al., *On Designing Minimax Adjustable Wideband Fractional Delay FIR Filters using Two-Rate Approach*, Multimedia Systems Department, Faculty of Electronics, Telecommunication and Information, Gdansk University of Technology, Gdansk, Poland, 4 pages.
V. Välimäki et al., *Principles of Fractional Delay Filters*, IEEE International Conference on Accustics, Speech and Signal Processing (ICASSP'00), Istanbul, Turkey Jul. 5-9, 2000, 4 pages.
Jørgen Arendt Jensen, *A model for the propagation and scattering of ultrasound in tissue*, J. Accoust. Soc. Am 89(1), Jan. 1991, 0001-4966/91/010182-09 © 1990 Acoustical Society of America, 9 pages.
Jørgen Arendt Jensen et al., *Calculation of Pressure Fields from Arbitrarily Shaped, Apodized and Exited Ultrasound Transducers*, IEEE Transactions on Ultrasonics, Ferrorelectrics, and Frequent Control, vol. 39, No. 2, Mar. 1992, 6 pages.
Jørgen Arendt Jensen, *Linear Description of Ultrasound Imaging Systems*, Notes for the International Summer School on Advances Ultrasound Imaging, Technical University of Denmark, Jul. 5-9, 1999 (Release 1.01, Jul. 29, 2001), Jun. 10, 1999, 74 pages.

Hakan Johansson et al., *On the Design of Adjustable Fractional Delay FIR Filters*, IEEE Transactions on Circuits and Systems—II: Analog and Digital Signal Processing, vol. 50, No. 4, Apr. 2003, 6 pages.
G.S. King et al., *Real Time Synthetic Aperture Imaging System*, 1980 Ultrasonic Symposium, 0090-5607/80/0000-0722 © 1980 IEEE, 10 pages.
Jacob Kortbek et al., *Comparing Interpolation Schemes in Dynamic Receive Ultrasound Beomforming*, 2005 IEEE Ultrasonic Symposium, 0-7803-9383-X/05 © 2005 IEEE, 4 pages.
Hon Keung Kwan et al., *FIR, Allpass, and IIR Variable Fractional Delay Digital Filter Design*, IEEE Transactions on Circuits and Systems—I: Regular Papers, vol. 56, No. 9, Sep. 2000, 1549-8328 © 2009 IEEE, 11 pages.
Hon Keung Kwan et al., *Low-Order Fixed Denominator IIR VFD Filter Design*, 978-1-4244-3828-0/09 © 2009 IEEE, 4 pages.
Timo I. Laakso et al., *Tools for Fractional Delay Filter Design*, Splitting the Unit Delay, IEEE Signal Processing Magazine, 1053-5888/96 © 1996 IEEE, Jan. 1996, 31 pages.
Timo I. Laakso et al., *Principles of Fractional Delay Filters*, Helsinki University of Technology, Laboratory of Acoustics and Audio Signal Processing, 0-7803-6293-4/00 © 2000 IEEE, 4 pages.
Ussanai Nithirochananont et al., *An FPGA-Based Implementation of Variable Fractional Delay Filter*, 2009 5$^{th}$ International Colloquium on Signal Processing & Its Applications (CSPA), 978-1-4152-5/09 © 2009 IEEE, 4 pages.
Shaza A. Mohamed et al., *Design of Digital Apodization Technique for Medical Ultrasound Imaging*, 2013 International Conference on Computing, Electrical and Electronic Engineering (ICCEEE), 978-1-4673-6232-0/13 © 2013 IEEE.
Svetoslav Ivanov Nikolov, *Practical Applications of Synthetic Aperture Imaging*, 2010 IEEE International Ultrasonics Symposium Proceedings, 978-1-4577-0380-2/10 © 2010 IEEE, 9 pages.
Orhan Norman, *FP 14.6: A Band-Pass ΔΣ Modulator for Ultrasound Imaging at 160MHz Clock Rate*, ISSCC96, Session 14, Sigma-Delta Converters, Paper FP 14.6, 1996 IEEE International Solid-State Circuits Conference, 3 pages.
D.K. Peterson et al., *Real-Time Digital Imaging*, © 1981 IEEE, 1981 Ultrasonic Symposium, 0090-5607/81/0000-0919, 6 pages.
D.K. Peterson et al., *Reducing Sidelobe Levels of a Synthetic Aperture Digital Acoustic Imaging System*, © 1982 IEEE, 1982 Ultrasonic Symposium, 0090-5607/82/0000-0815, 6 pages.
D.K. Peterson et al., *Real-Time Digital Image Reconstruction: A Description of Imaging Hardware and an Anaysis of Quantization Errors*, IEEE Transactions on Sonics and Ultrasonics, vol. SU-31, No. 4, Jul. 1984, 15 pages.
Jacob Kortbek, *Synthetic Aperture Sequential Beamforming and other Beamforming Techniques in Ultrasound Imaging*, Jan. 2008, B-K Medical, Denmark & Center for Fast Ultrasound Imaging, CFU, Technical University of Denmark, 198 pages.
Martin Christian Hemmsen, *Image Processing in Medical Ultrasound*, DTU Electrical Engineering, Technical University of Denmark, Jul. 2011, 235 pages.
Carson K.S. Pun et al., *An Efficient Design of Fractional-Delay Digital FIR Filters Using the Farrow Structure*, © 2001 IEEE, 0-7803-7011/2/01, 4 pages.
Carson K.S. Pun et al., *On the Design and Efficient Implementation of the Farrow Structure*, IEEE Signal Processing Letters, vol. 10, No. 7, Jul. 2003, 1070-9908/03$17.00 © 2003 IEEE, 4 pages.
K. Rajalakshmi et al., *A Fractional Delay FIR Filter Based on Lagrange Interpolation of Farrow Structure*, International Journal of Electrical and Electronics Engineering (IJEEE), ISSN (Print): 2231-5284 vol. 1 Iss-4, 2012, 5 pages.
A. Rothermel et al., *Analog Phase Measuring Circuit for Digital CMOS IC's*, IEEE Journal of Solid-State Circuits, vol. 28, No. 7, Jul. 1993, 4 pages.
N.R. Scales et al., *A Programmable Multi-Channel CMOS Pulser Chip to Drive Ultrasonic Array Transducers*, IEEE Journal of Solid-State Circuits, vol. 29, No. 8, Aug. 1994, 3 pages.
Ivan W. Selesnick, *All-pass and Fractional-delay Filters*, May 20, 2010, 9 pages.

(56) References Cited

OTHER PUBLICATIONS

Ivan W. Selesnick et al., *Maximally Flat Low-Pass FIR Filters with Reduced Delay*, IEEE Transactions on Circuits and Systems—II: Analog and Digital Signal Processing, vol. 45, No. 1, Jan. 1998, 16 pages.

Bruno Stefanelli et al., *An Analog Beam-Forming Circuit for Ultrasound Imaging Using Switched-Current Delay Lines*, IEEE Journal of Solid-State Circuits, vol. 35, No. 2, Feb. 2000, 10 pages.

P.R. Stephanishen, *The Transient Response of Arrays of Transducers*, Jan. 8, 1971, vol. 50, No. 3, Part 2, 11 pages.

Peter R. Stephanishen, *Pulsed Transmit/Receive Response of Ultrasonic Piezoelectric Transducers*, J. Acoust. Soc. Am. 69(6), Jun. 1981, 0001-4966-81/061815-13 © 1981 Acoustical Society of America, 13 pages.

LM96550 Ultrasound Transmit Pulser, SNAS504F—Aug. 2010—Revised May 2013, www.ti.com, © 2010-2013, Texas Instruments Incorporated, 15 pages.

Chien-Cheng Tseng, *Design of Variable Fractional Delay FIR Filter Using Symmetry*, 0-7803-8251-X/04/$17.00 © 2004 IEEE, 4 pages.

K. M. Tsui et al., *A New Method for Designing Casual Stable IIR Variable Fractional Delay Digital Filters*, IEEE Transactions on Circuits and Systems—II: Express Briefs, vol. 54, No. 11, Nov. 2007, 5 pages.

Vesa Välimäki, *A New Filter Implementation Strategy for Lagrange Interpolation*, Helsinki University of Technology, 0-7803-2570-2/95 $4.00 © 1995, IEEE, 4 pages.

Vesa Välimäki, et al. *Fractional Delay Digital Filters*, 0-7803-1254-6/93$03.00 © 1993 IEEE, 4 pages.

Jussi Vesma et al., *Optimization and Efficient Implementation of Fractional Delay FIR Filters*, ICECS '96, Signal Processing Laboratory, Tampere University of Technology, Tampere, Finland, 4 pages.

Jussi Vesma et al., *Optimization and Efficient Implementation of FIR Filters with Adjustable Fractional Delay*, 1997 IEEE International Symposium on Circuits and Systems, Jun. 9-12, 1997, Hong Kong, 0-7803-3583-X/97 © 1997 IEEE, 4 pages.

Jussi Vesma et al., *Design and Properties of Polynominal-Based Fractional Delay Filters*, OSCAS 2000, IEEE International Symposium on Circuits and Systems, May 28-31, 2000, Geneva, Switzerland, 00-7803-5482-6/99/$10.00 © 2000 IEEE.

Wei Wang et al., *Optimization and Design of Fractional-delay Filters Based on Farrow Structure*, Journal of Computational Information Systems 8: 24 (2012), 1553-9105/Copyright © 2012 Binary Information Press, Dec. 15, 2012, 7 pages.

International Search Report and Written Opinion issued in International Patent Application Serial No. PCT/US2015/054181 dated Jan. 11, 2016, 9 pages.

Notice of Allowance issued in JP Patent Application Serial No. 2017-517792 dated Mar. 18, 2019, 3 pages.

English Abstract of JP2008-070404.

English Abstract of JP2010-124066.

\* cited by examiner

SYSTEMS AND METHODS FOR ULTRASOUND BEAMFORMING

PRIORITY DATA

This application is a non-provisional of U.S. Provisional Patent Application Ser. No. 62/060,517, filed Oct. 6, 2014, which is hereby incorporated by reference in its entirety.

TECHNICAL FIELD OF THE DISCLOSURE

The present invention relates to the field of integrated circuits, in particular to ultrasound devices.

BACKGROUND

Ultrasound uses echolocation for detection and imaging. Ultrasound machines utilize arrays of microphones and speakers to perform excitation and recording of echoes from the item being investigated. A signal including ultrasonic energy is transmitted through an ultrasound transducer in short bursts. After each burst, for a short period of time correlating to the amount of time for the ultrasonic energy to reach a target and reflect back to the transducer, the ultrasound machine receives reflected signals. Signals received during the short period undergo additional signal processing to determine the source locations of targets from which the signals reflected.

OVERVIEW

Ultrasound machines process reflected ultrasound signals to determine source locations of targets, for example imaging targets such as tissue. Ultrasound machines utilize arrays of microphones and speakers to perform excitation and recording of echoes from the item being investigated. Ultrasound analysis is performed in the 2 MHz-18 MHz frequency range, making it impractical to perform AD conversion in the transducer as the data rates become unwieldy. Thus, focusing in ultrasound has been limited to mechanical focusing by moving speakers and/or microphones. According to one implementation of the current disclosure, an analog beamformer allows receiver-based focusing while retaining the properties of an analog system.

In one example, an ultrasound machine uses an array of 128 microphones. Low-powered Sampled Analog beamforming can be added in front of each microphone to focus pairs or groups of microphones on an area of interest. According to one example, the area of focus is cone-shaped. The information from the array of microphones can be compressed using sampled analog beamforming technology to make it appear like a virtual microphone in an analog domain. In various applications, null-steering or beam-steering can be used to track or focus on something in an ultrasound image.

One approach to sampled analog beamforming for ultrasound systems uses a filter structure such as a Farrow filter. The filter can be used to add a fractional delay to the analog signal being filtered. Another approach to sampled analog beamforming for ultrasound systems uses a skewed delay.

According to one implementation, a system for ultrasound beamforming includes a sampled analog beamformer, an array of ultrasound transducers, and a high voltage amplifier coupled to the sampled analog beamformer and the array of ultrasound transducers configured to drive transducers in the array of ultrasound transducers. The sampled analog beamformer including a sampled analog filter for filtering an incoming analog signal and adding a fractional delay, and transmitting a filtered analog ultrasound signal. The array of ultrasound transducers for further transmitting the filtered analog ultrasound signal.

In some implementations, the sampled analog filter is a farrow filter. In other implementations, the sampled analog filter includes a fractional delay filter bank and a finite impulse response filter.

In various implementations, the ultrasound transducers receive reflected signals, and the system further includes an amplifier for amplifying the received reflected signals, and a receive sampled analog beamformer including a sampled analog filter for filtering the received reflected signals. In some examples, the receive sampled analog beamformer further includes an anti-aliasing filter to filter out aliases. In other examples, the receive sampled analog beamformer uses a skewed delay for introducing a delay to the received reflected signals.

In one implementation, the system for ultrasound beamforming includes a coefficient generator for updating the fractional delay. In some examples, the coefficient generator updates the fractional delay based on a target of an ultrasound focus beam. In some examples, the coefficient generator updates the fractional delay for each pixel of an ultrasound image.

In some implementations, the system for ultrasound beamforming includes a bang-bang transmitter for generating an input signal and a chirp digital-to-analog converter for receiving the input signal and converting it to the incoming analog input.

In various implementations, the ultrasound transducers receive reflected signals, and the system for ultrasound beamforming further includes a switch, wherein when the switch is in a first position, the sampled analog beamformer filters the incoming analog signal and transmits the filtered analog ultrasound signal, and when the switch is in a second position, the sampled analog beamformer filters the received reflected signals.

In one implementations, a system for ultrasound beamforming includes an array of ultrasound transducers for receiving a reflected analog ultrasound signal, and a sampled analog beamformer coupled to the array of ultrasound transducers. The sampled analog beamformer is for filtering the reflected analog ultrasound signal to form a sampled analog signal, and beamforming the sampled analog signal. The sampled analog beamformer includes a summation node for adding the sampled analog signal to parallel sampled analog signals from parallel sampled analog beamformers.

In some implementations, the sampled analog beamformer further comprises a farrow filter for introducing a fractional delay to the reflected analog ultrasound signal. In further implementation, the sampled analog beamformer also includes a coefficient generator for updating the fractional delay. In one example, the coefficient generator updates the fractional delay based on a target of an ultrasound focus beam.

In one implementation, the sampled analog beamformer further comprises a sampled analog filter for introducing a fractional delay to the reflected analog ultrasound signal. In another implementation, the sampled analog beamformer uses a skewed delay for introducing a delay to the reflected analog ultrasound signal. In some implementations, the sampled analog beamformer includes a fractional delay filter bank and a finite impulse response filter. In other implementations, the sampled analog beamformer further includes an anti-aliasing filter to filter out aliases.

In one implementation, an ultrasound probe includes a system for ultrasound beamforming, including a sampled analog beamformer including a sampled analog filter for filtering an incoming analog signal and adding a fractional delay, and transmitting a filtered analog ultrasound signal, an array of ultrasound transducers for further transmitting the filtered analog ultrasound signal, and a high voltage amplifier coupled to the sampled analog beamformer and the array of ultrasound transducers configured to drive transducers in the array of ultrasound transducers.

In some implementations, a system for ultrasound beamforming includes an array of ultrasound transducers for transmitting a filtered analog ultrasound signal and receiving a reflected analog ultrasound signal, and a sampled analog beamformer coupled to the array of transducers. The sampled analog beamformer includes means for filtering an incoming analog signal, adding a fractional delay, and transmitting the filtered analog ultrasound signal to the array of transducers, and for filtering the reflected analog ultrasound signal to form a sampled analog signal and beamforming the sampled analog signal.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
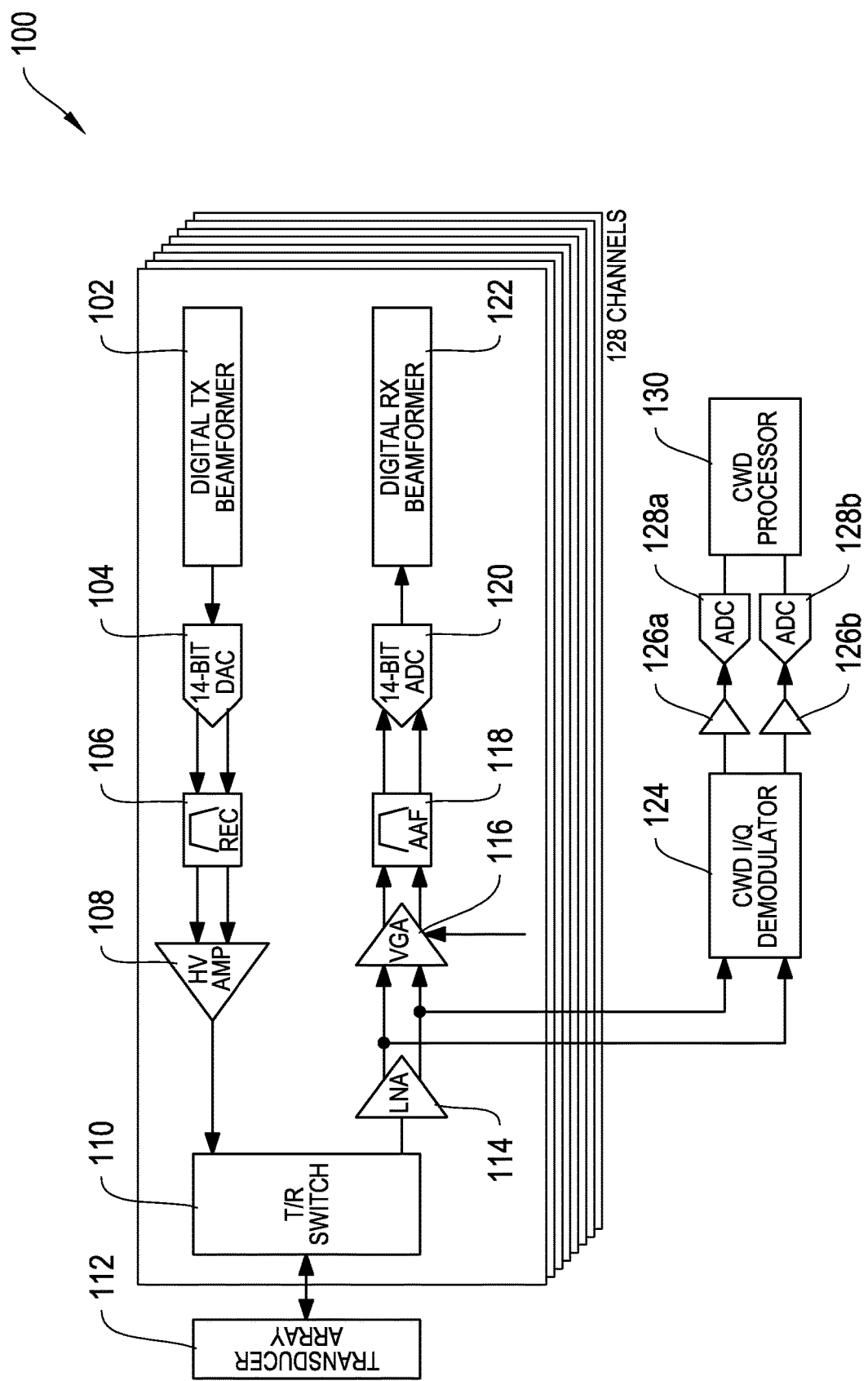
FIG. 1 is a diagram illustrating a traditional ultrasound beamforming architecture.

FIG. 1 is a diagram illustrating a traditional ultrasound beamforming architecture 100. In a traditional ultrasound machine, a digital transmit beamformer 102 is coupled to a digital-to-analog converter (DAC) 104. The digital transmit beamformer 102 transmits a digital signal, which is converted to analog at the DAC 104. The DAC 104 is coupled to an anti-aliasing filter (AAF) 106, which filters the analog signal to remove any aliasing. The AAF 106 is coupled to a high voltage (HV) amplifier 108, which is coupled to a transmit/receive switch 110. The transmit/receive (T/R) switch 110 allows the ultrasound machine to transmit a signal for selected bursts of time, and then switch to a receive mode for a short period of time so that it can receive reflected transmit signals. The T/R switch 110 is coupled to a transducer array 112. The transducer array 112 includes an array of microphones for receiving reflections of the transmitted ultrasound signals. The microphone array may include any selected number of microphones, and according some examples, the array may include 128 microphones, 192 microphones, 256 microphones, or more than 256 microphones. The microphone array may be arranged as 1D (linear), as a N×N 2D array, or as an N×M 2D array.

For the receive side of the ultrasound architecture, the transducer array 112 transmits received signals to the T/R switch 110, which is coupled to a low noise amplifier (LNA) 114. From the LNA 114, the signal is transmitted to both a digital beamformer 122, and a continuous wave Doppler (CWD) processor 130. In particular, to reach the digital beamformer 122, the LNA 114 is coupled to a variable gain amplifier (VGA) 116 which is coupled to an AAF filter 118. The AAF filter 118 is coupled to an analog-to-digital converter (ADC) 120, which is coupled to the digital receive (RX) beamformer 122. The digital RX beamformer 122 performs beamforming on the digital signal to enhance the signal and reduce noise. As shown in FIG. 1, the beamforming circuit architecture is repeated eight times to allow 128 channels to be processed. According to other implementations, the beamforming circuit architecture can be repeated any number of times.

For the CWD processing of the reflected signals, the LNA 114 is coupled to a CWD I/Q demodulator 124 which separates the signal into I and Q components. The CWD I/Q demodulator is coupled to two amplifiers 126a, 126b (one for the I signal component and one for the Q signal component), and each amplifier is coupled to an AD converter 128a, 128b. The AD converters 128a, 128b are coupled to the CWD processor 130, which processes the received signals. Doppler processing is typically used for color imaging, which can be used, for example, to show flow rates of fluids.

Figure 2:
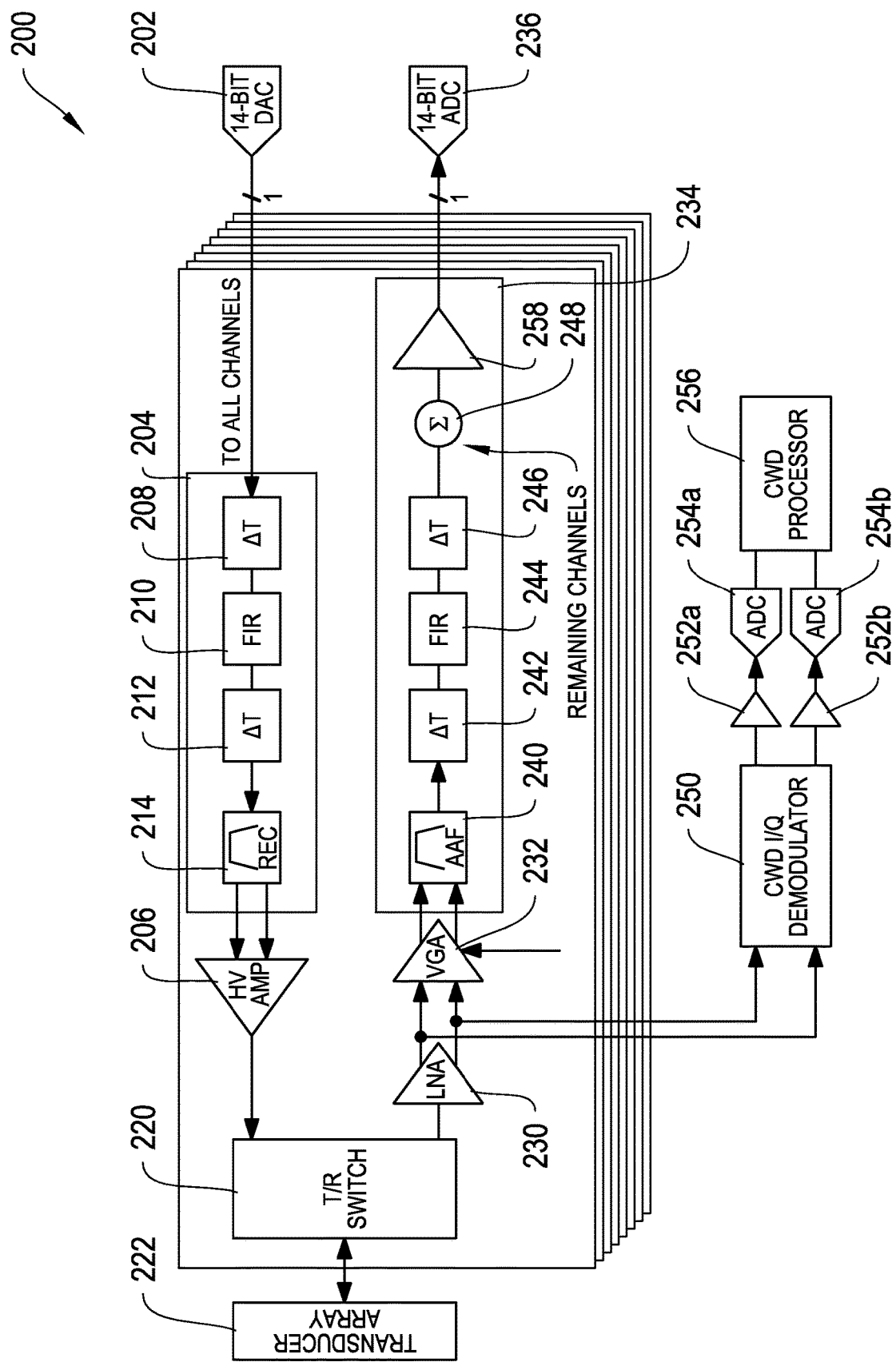
FIG. 2 is a diagram illustrating an ultrasound beamforming architecture including an analog beamformer, according to some embodiments of the disclosure.

FIG. 2 is a diagram illustrating an ultrasound beamforming architecture including an analog beamformer, according to some embodiments of the disclosure. As shown in FIG. 2, the sampled analog beam-forming architecture 204 for the transmit side of the ultrasound system is placed between the DAC 202 and the HV amplifier 206. The sampled analog beam-forming architecture 234 for the receive side of the ultrasound system is placed between the VGA 232 and the ADC 236.

For transmit (TX) beamforming, the target output waveform is delayed to create a focused sound beam at the transducer array that can target a particular area of interest. For the TX beamformer, a beamformer central control processor is coupled to a DAC 202. In one example, the DAC 202 is a 14-bit DAC. The beamformer central control processor generates a number of signals, which are transmitted to the DAC 202. The DAC 202 converts the digital waveforms into analog signals. The DAC 202 is coupled to a sampled analog TX beamformer 204, which is coupled to a high voltage (HV) amplifier 206. The DAC 202 transmits the analog signal to the TX beamformer 204, which performs sampled analog beamforming, and transmits the signal to the HV amplifier 206. The sampled analog TX beamformer 204 expands one or more channels into a larger number of fractionally delayed channels.

The sampled analog TX beamformer 204 shown in FIG. 2 includes a first delay filter ($\Delta T$) 208, coupled to a Finite Impulse Response (FIR) filter 210, coupled to a second delay filter ($\Delta T$) 212, coupled to a reconstruction (REC) filter 214. The first 208 and second 212 delay filters are fractional delay filter banks. According to various embodiments, only one of the first 208 and second 212 delay filters is included. In some implementations, for example in sampled analog beamforming with a farrow type filter, the first delay filter 208 is used, and the delay occurs before the FIR filter 210. The first delay filter 208 may be a coarse, integer type delay. In other implementations, the second delay filter 210 is used and the delay occurs after the FIR filter 210. According to one embodiment, the use of sampled analog technology allows the implementation of the FIR filters as a network of switch cap components.

The output from the sampled analog TX beamformer 204 is coupled to the HV amplifier 206. In one example, the HV amplifier 206 is supplied by +/−90-100V. The high voltage is used to drive the piezo transducers of the ultrasound transducer array 222. The output from the HV amplifier 206 is coupled to a transmit/receive (T/R) switch 220, which, when switched to the transmit mode, transmits the signal to the transducer array 222.

According to various implementations, the Digital TX beamformer is implemented in a single FPGA or an array of FPGAs. The incoming data rate can be very high. For example, the incoming data rate may be about 40-160 MSPS, or more, for a 14-bit word. A high oversampling rate is utilized for proper beamforming, which leads to ×4 to ×10 oversampling over Nyquist. An analog beamformer has—in principle—infinite delay resolution, which leads to no oversampling requirement as the delay line can be realized using a fractional delay filter. This results in a large amount of data for a small, 128 channel system, which can not be fully processed by a conventional digital signal processor in a timely manner.

The ultrasound beamforming architecture shown in FIG. 2 also include receive (RX) sampled analog beamforming. Signals received at the transducer array 222 are sent back to the T/R switch 220, which receives signals in the "receive" mode. The T/R switch 220 is coupled to a low noise amplifier (LNA) 230. The LNA 230 is coupled to a variable gain amplifier (VGA) 232, which is coupled to a receive (RX) sampled analog beamformer 234. The LNA 230 is also coupled to a CWD processor 256.

The receive sampled analog beamformer 234 receives a signal from the VGA 232. The sampled analog beamformer 234 includes an anti-aliasing filter (AAF) 240, a third delay filter ($\Delta T$) 242, a FIR filter 244, a fourth delay filter ($\Delta T$) 246, and a summation node 248. According to various embodiments, only one of the third 242 and fourth 246 delay filters is included. In some implementations, for example in sampled analog beamforming with a farrow type FIR filter, the third delay filter 242 is used, and the delay occurs before the FIR filter 244. The third delay filter 242 may be a course, integer type delay. In other implementations, the fourth delay filter 246 is used and the delay occurs after the FIR filter 244. In some implementations, a delay filter is placed after the analog-to-digital filter 236.

The summation node 248 adds the sampled analog signal from the sampled analog beamformer 234 with the sampled analog signal from parallel sampled analog beamformers, allowing for the signals from multiple channels to be summed together. The output of the summation node 248 is amplified at amplifier 258 and transmitted to an analog to digital converter (ADC) 236.

According to some implementations, the transit time for the ultrasound signals to targets that are 20-200 mm away from the transducer (e.g., most medical imaging) is about 100-200 microseconds. The sampling time may be about 25 ns between samples (40 MHz).

Ultrasound devices generally include a table-top base station and probe that is placed over the imaging target. According to some implementations, the ultrasound beamforming architecture 200 can be positioned inside an ultrasound probe, reducing the amount of data that is passed back and forth between the probe and the base station, and thereby decreasing the number and or size of the wires or cords connecting the probe to the base station.

The CW path to the CWD processor 256 is a secondary use of the transmitter and transducer. According to one example, when it is used, a very long transmit signal (many pulses) is emitted and the transducer signal is shown here processed separately. The transmitted signal may be ten pulses, twenty pulses, or more than twenty pulses. After the transmit signal, the received signal can go through both the SA path to the ADC 236 and the CW path to the CWD processor 256. In one implementation, the SA path is re-configured to pass the receive signal in a different way.

Figure 3:
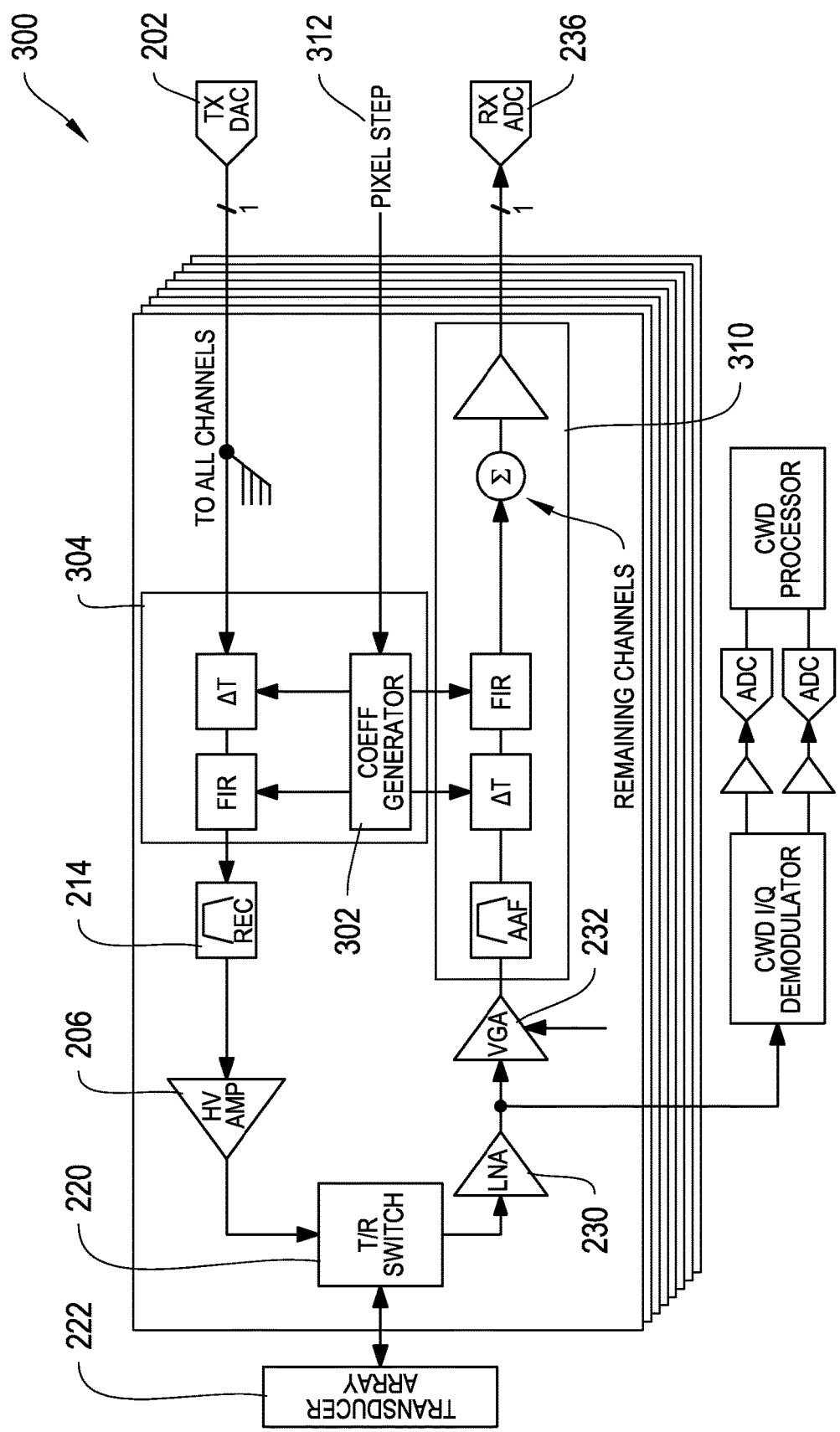
FIG. 3 is a diagram illustrating an ultrasound beamforming architecture in which delay elements are updated on a per pixel basis, according to some embodiments of the disclosure.

FIG. 3 is a diagram illustrating an ultrasound beamforming architecture 300 in which delay elements are updated on a per pixel basis, according to some embodiments of the disclosure. The ultrasound beamforming architecture 300 shown in FIG. 3 is similar to the ultrasound beamforming architecture 200 shown in FIG. 2. However, the sampled analog RX beamformer 304 and the sampled analog TX beamformer 310 use input from a coefficient generator 302 to update delay elements on a per pixel basis. The coefficient generator 302 generates coefficients for updating the fractional delay filters and the integer delays depending on the target of the focus beam of the ultrasound. For example, each pixel may use a set of filter coefficients and other values, which are loaded into the signal processing core of the chip. A set of filter coefficients and other values may be stored in a page of on-chip memory. The coefficient generator can sequentially load each new page into the core of the chip based on the pixel step signal. According to one feature, the coefficient generator 302 receives data external data regarding the target and can be preloaded with coefficients. This allows the ultrasound to dynamically focus on targets of interest during an ultrasound scan. Including the coefficient generator 302 in the sampled analog beamformer further decreases the amount of data passed back and forth from the ultrasound probe to the ultrasound base station, thereby decreasing the number and/or size of the wires needed between the probe and the base station.

Figure 4:
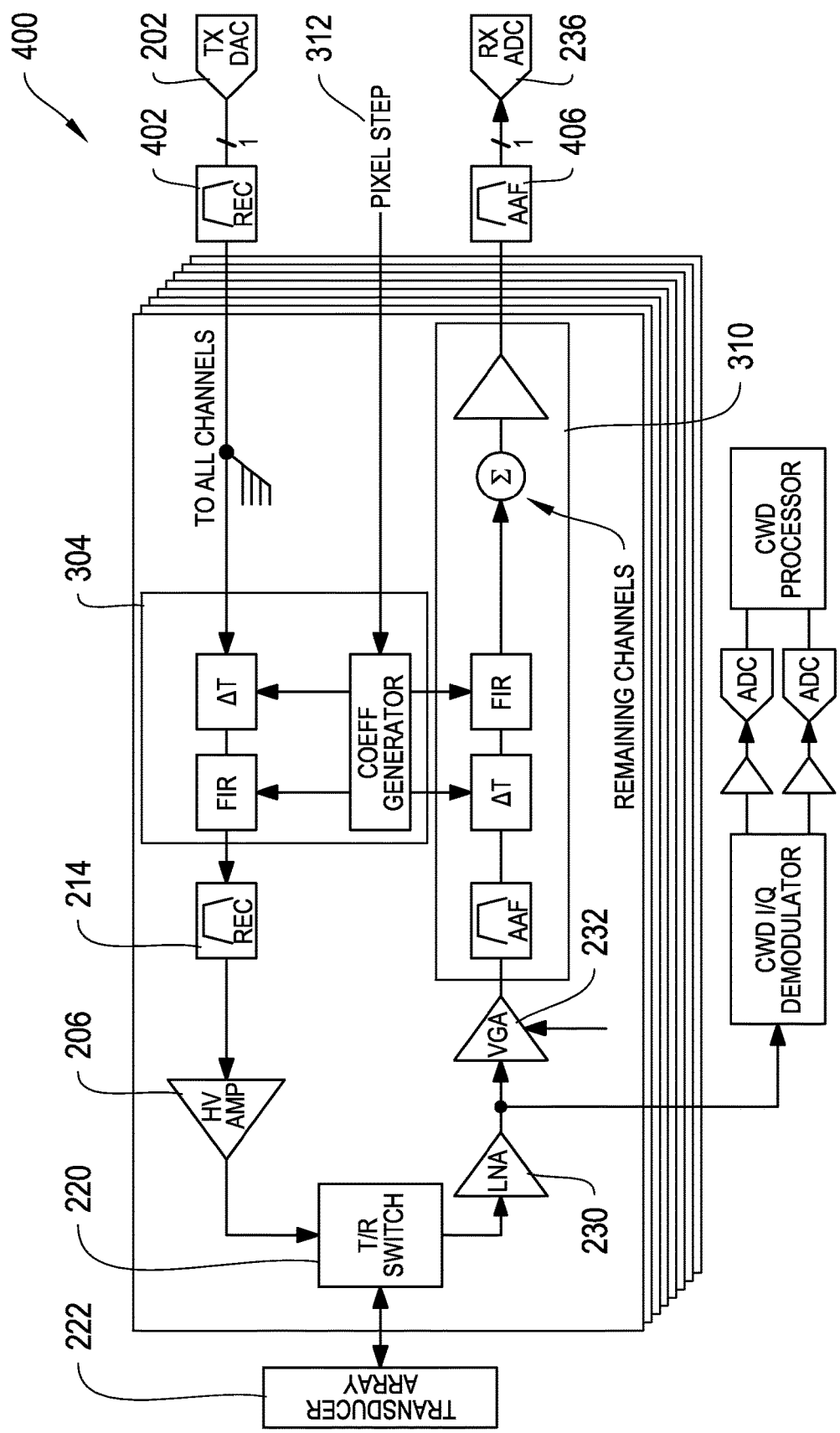
FIG. 4 is a diagram illustrating an ultrasound beamforming architecture including a reconstruction filter and an antialiasing filter, according to some embodiments of the disclosure.

FIG. 4 is a diagram illustrating an ultrasound beamforming architecture 400 similar to the ultrasound beamforming architecture 300 of FIG. 3, but including a reconstruction filter 402 coupled to the transmit DAC 202, and an antialiasing filter 406 coupled to the receive ADC 236, according to some embodiments of the disclosure.

Figure 5:
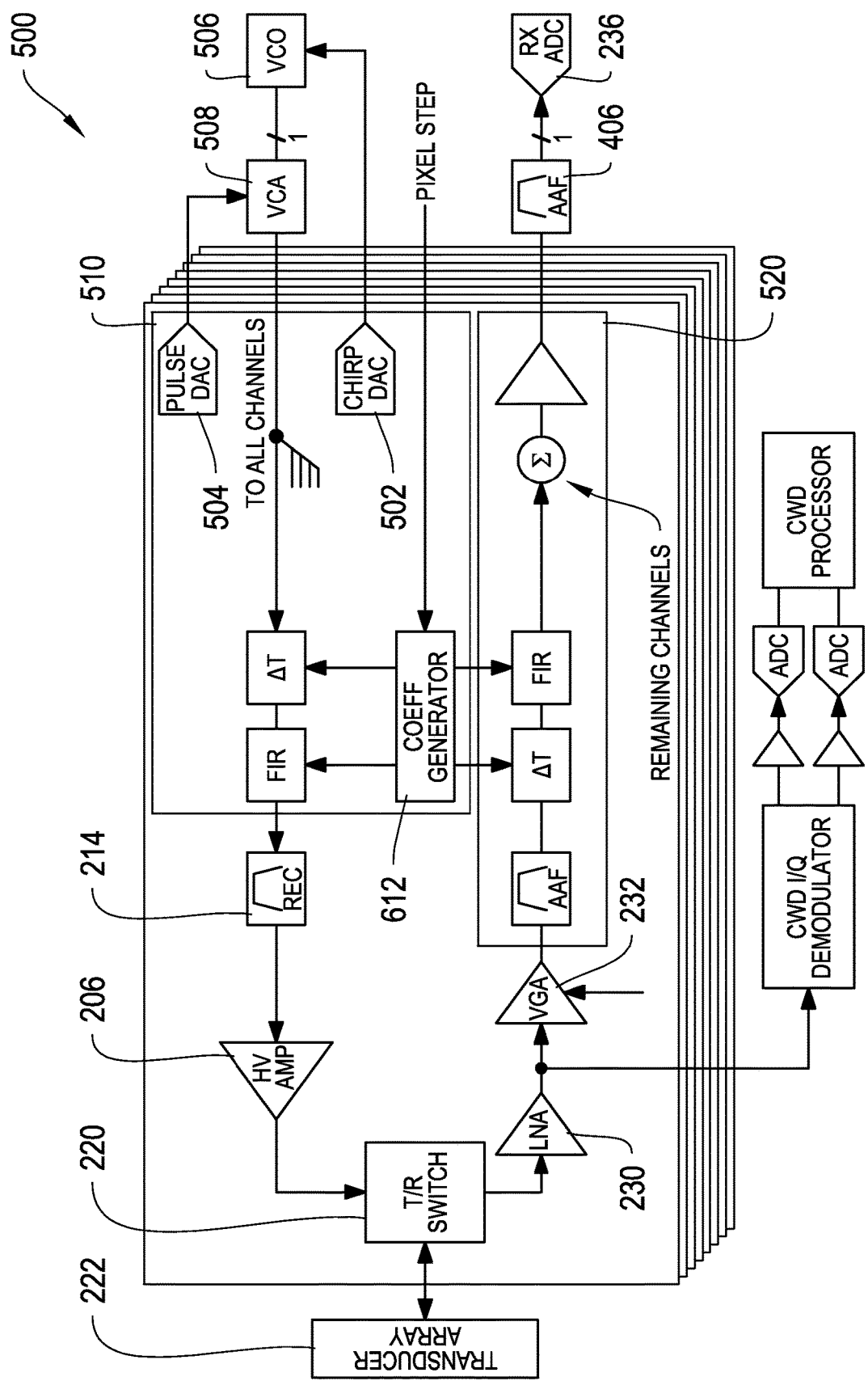
FIG. 5 is a diagram illustrating another ultrasound beamforming architecture including an analog beamformer designed for bang-bang operation, according to some embodiments of the disclosure.

FIG. 5 is a diagram illustrating another ultrasound beamforming architecture 500 including an analog beamformer 506 designed for bang-bang operation, according to some embodiments of the disclosure. In FIG. 5, no DAC is used when signals are generated using a bang-bang transmitter. In other implementations, a DAC is used when signals are generated using a bang-bang transmitter. In one example, a DAC used when signals are generated using a bang-bang transmitter outputs a simple pulse shape. A pulse can also be generated as a chirp or a barker pulse. The pulse may be a modulating sine wave. These types of transmission signals are commonly used for fetal monitoring and heart scanning, for example.

The ultrasound beamforming architecture 500 includes a chirp DAC 502 coupled to a voltage controlled oscillator (VCO) 506, and pulse DAC 504 coupled to a voltage controlled amplifier (VCA) 508. A signal from the chirp DAC 502 is transmitted from the VCO 506 to the sampled analog beamformer 510. Similarly, a signal from the pulse DAC 504 is transmitted from the VCA 508 to the sampled analog beamformer 510. According to one implementation, only one external chirp DAC is used, and the signal is fanned out to other channels on the chip. In one example, the signal from an external chirp DAC is fanned out to all the channels on the chip. The other elements of the ultrasound beamforming architecture 500 function similarly to those shown in FIG. 4.

Variations on the bang-bang amplifier include an amplifier that uses piezo elements that self-resonant to create the ultrasound pulse. In one example, the beam transmit of a bang-bang amplifier could be determined by the amplifier activation time such that traditional beamforming is not used. In some instances, a bang-bang pulse is considered an analog driven signal. In some implementations, a tuned digital delay-locked loop (DLL) is used for generating the bang-bang pulse.

Figure 6:
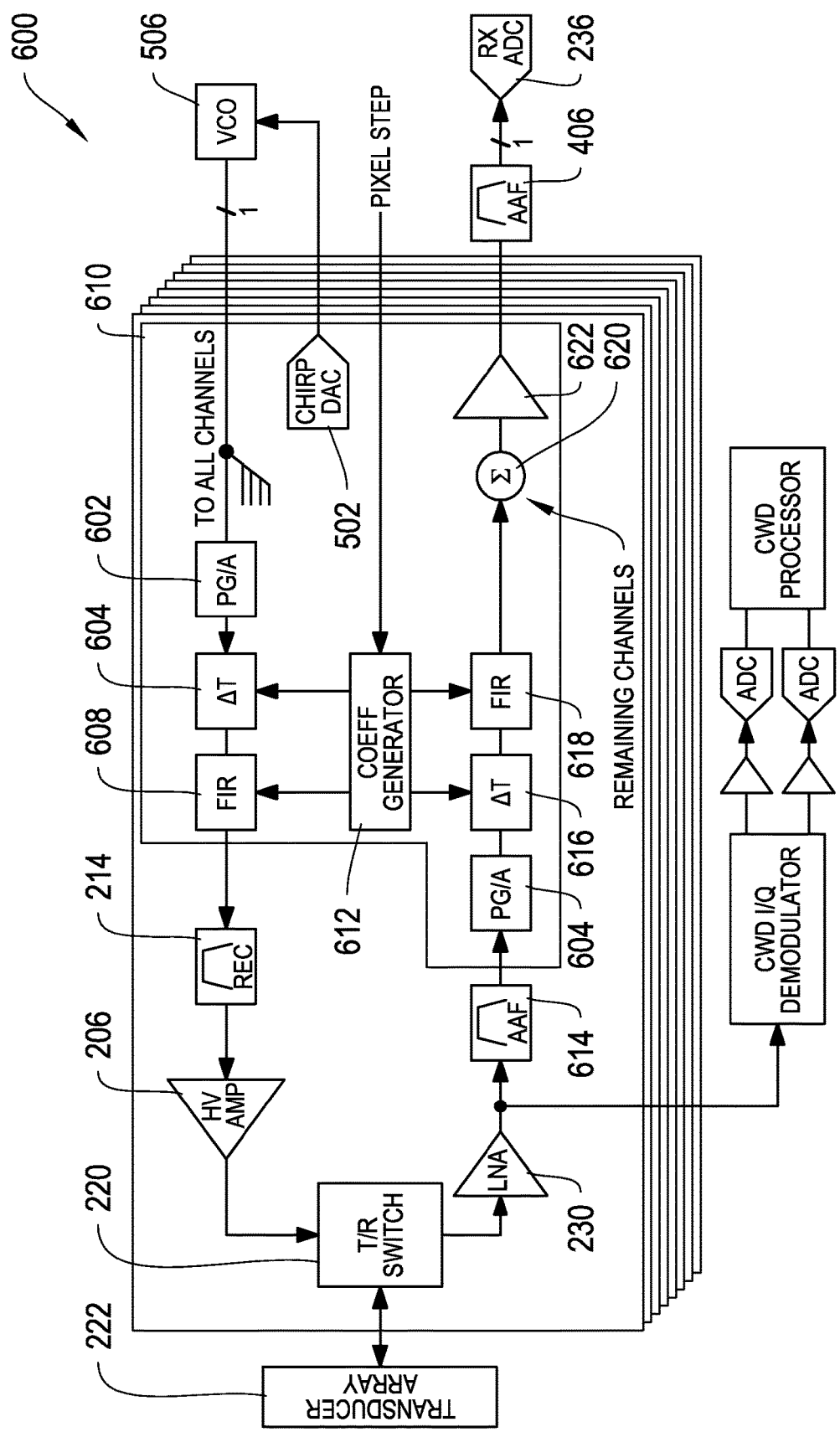
FIG. 6 is a diagram illustrating another ultrasound beamforming architecture with some elements absorbed into a sampled analog domain, according to some embodiments of the disclosure.

FIG. 6 is a diagram illustrating another ultrasound beamforming architecture 600 with some elements absorbed into a sampled analog domain 602, according to some embodiments of the disclosure. The ultrasound beamforming architecture 600 includes a first programmable gain amplifier (PG/A) 602 for the ultrasound TX beamformer. Signals from the VCO 506 are transmitted first to the PG/A 602, and from PG/A 602 to the time delay filter 606. Similarly, on the receive side of the ultrasound beamformer, a PG/A 604 is coupled to the anti-aliasing filter 614, such that signals from the anti-aliasing filter 614 are transmitted to the PGA 604, and from the PGA 604 to the time delay filter 616.

Figure 7:
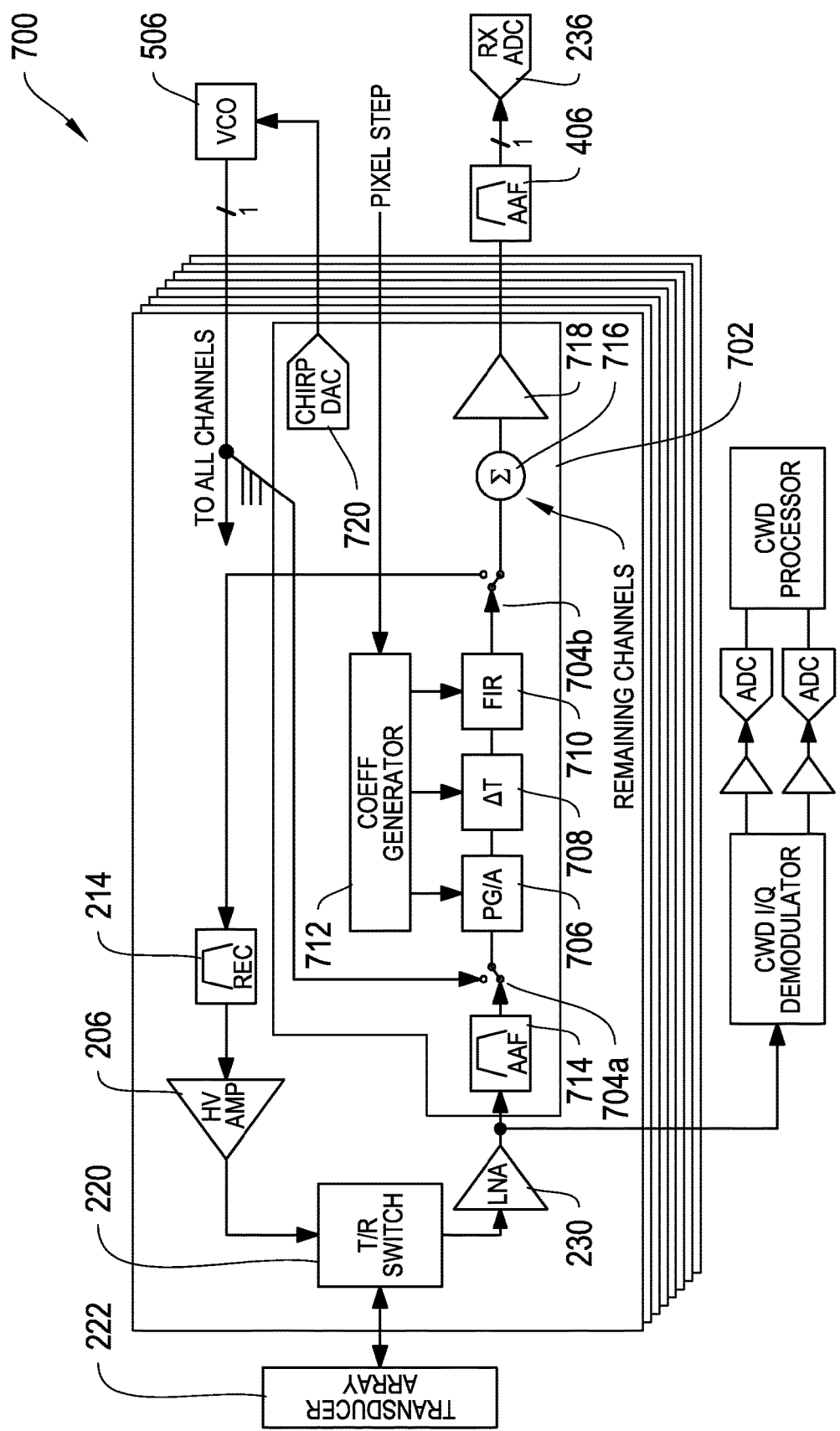
FIG. 7 is a diagram illustrating another ultrasound beamforming architecture in which the gain and delay elements are reused between the received and transmit paths, according to some embodiments of the disclosure.

FIG. 7 is a diagram illustrating another ultrasound beamforming architecture 700 in which the gain and delay elements are reused between the receive and transmit paths, according to some embodiments of the disclosure. The ultrasound beamforming architecture 700 shown in FIG. 7 includes a sampled analog beamforming architecture 702 that functions as both the transmit sampled analog beamformer and the receive sampled analog beamformer. The sampled analog beamforming architecture 702 combines the transmit and receive paths so that both use the same filters. In particular, the sampled analog beamforming architecture 702 includes first 704a and second 704b switches, which can be switched from transmit mode to receive mode. In FIG. 7, the switches 704a,b are shown positioned in receive mode.

The sampled analog beamforming architecture 702 also includes a chirp DAC 720, a PGA 706, a delay filter 708, a FIR 710, a coefficient generator 712, an AAF 714, a summation node 716, and an amplifier 718. In transmit mode, signals from the chirp DAC are transmitted to the VCO 506, and then transmitted from the VCO to the PGA 706, the delay filter 708, and the FIR filter 710. The PGA 706, the delay filter 708, and the FIR filter 710 also receive inputs from the coefficient generator 712 as described above with respect to FIG. 3. The sampled signal is then transmitted to the reconstruction filter 214 for transmission through the HV amplifier 206 and the T/R switch 220 to the transducer array 222.

In the receive mode, signals from the transducer array 222 are transmitted through the T/R switch 220 to the LNA 230 and the AAF 714 and through the switch 704a to the PGA 706, the delay filter 708, and the FIR filter 710. The PGA 706, the delay filter 708, and the FIR filter 710 also receive inputs from the coefficient generator 712 as described above with respect to FIG. 3. Following sampled analog beamforming, the signal is transmitted to the summation node, where it is combined with beamformed signals from other channels, and then to the amplifier 718. From the amplifier 718, the signal is transmitted to the AAF 406 and to the ADC 236.

Thus, the filter bank in the sampled analog beamforming architecture 702 is used for both the ultrasound transmissions and reflected signals.

Figure 8:
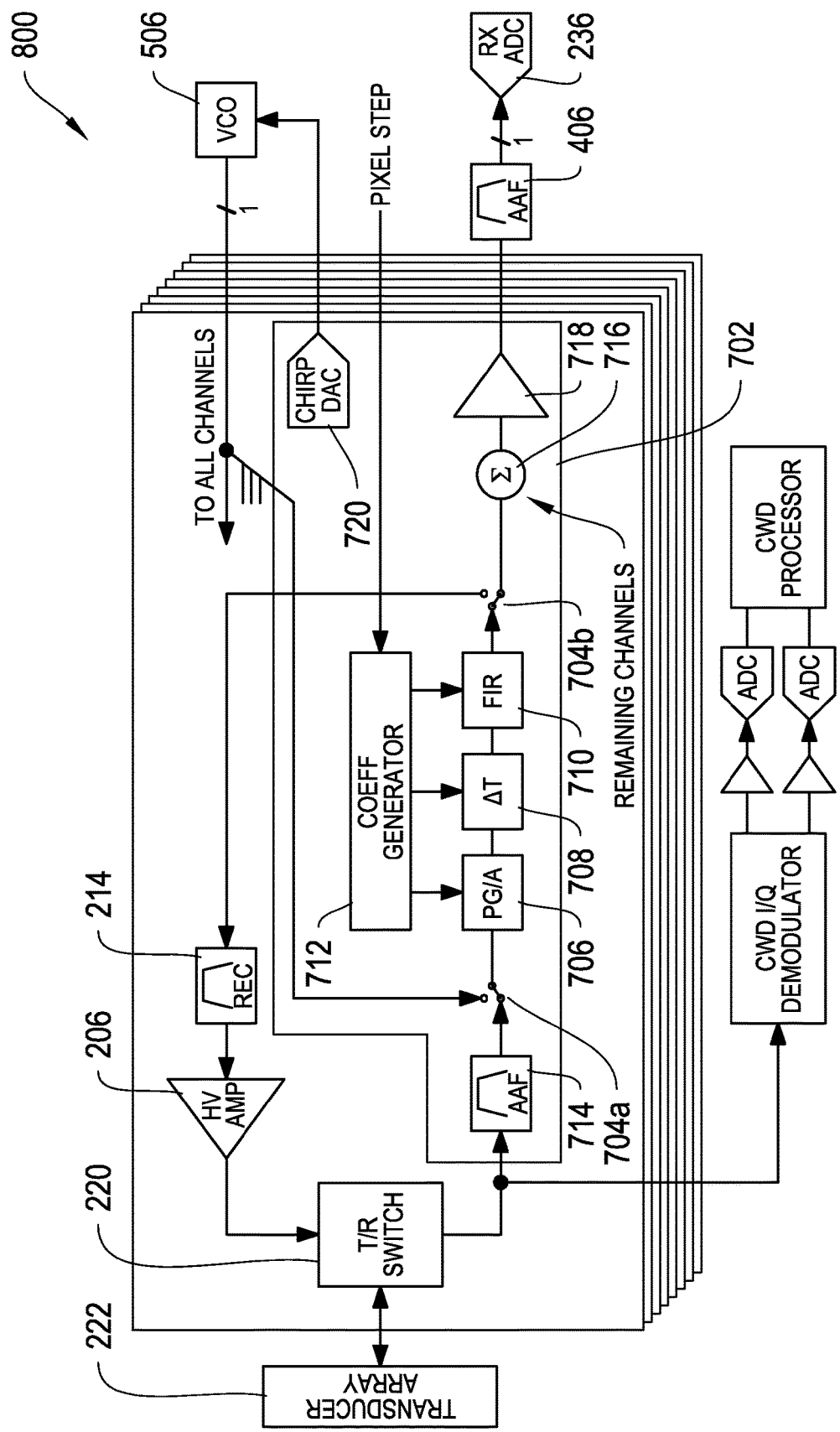
FIG. 8 is a diagram illustrating another ultrasound beamforming architecture, according to some embodiments of the disclosure.
Figure 9:
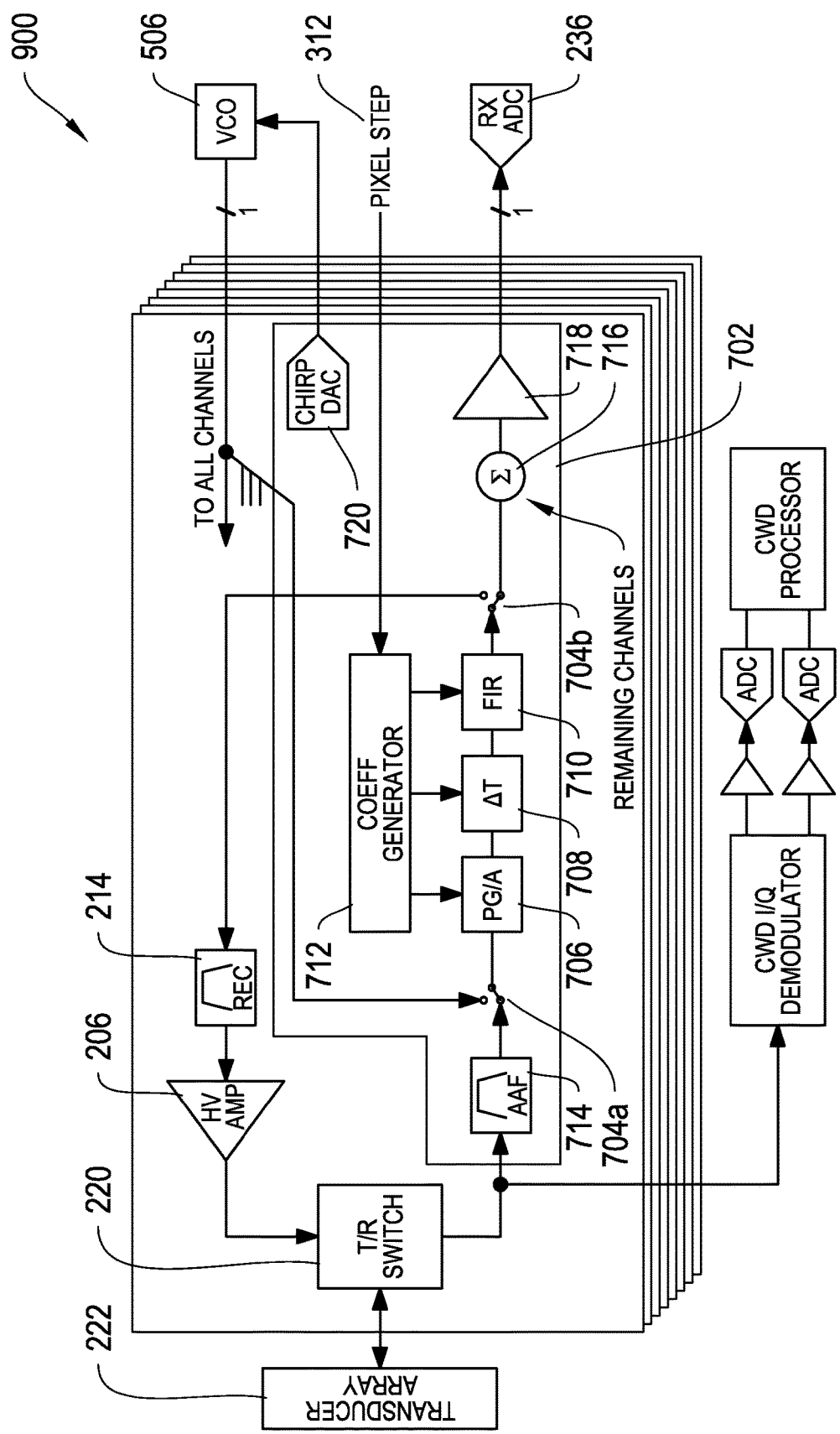
FIG. 9 is a diagram illustrating another ultrasound beamforming architecture, according to some embodiments of the disclosure.

FIGS. 8-12 show variations of the architecture shown in FIG. 7. FIG. 8 is a diagram illustrating an ultrasound beamforming architecture without the LNA on the received side, according to some embodiments of the disclosure. FIG. 9 is a diagram illustrating an ultrasound beamforming architecture without the AAF positioned just before the ADC on the receive side, according to some embodiments of the disclosure.

Figure 10:
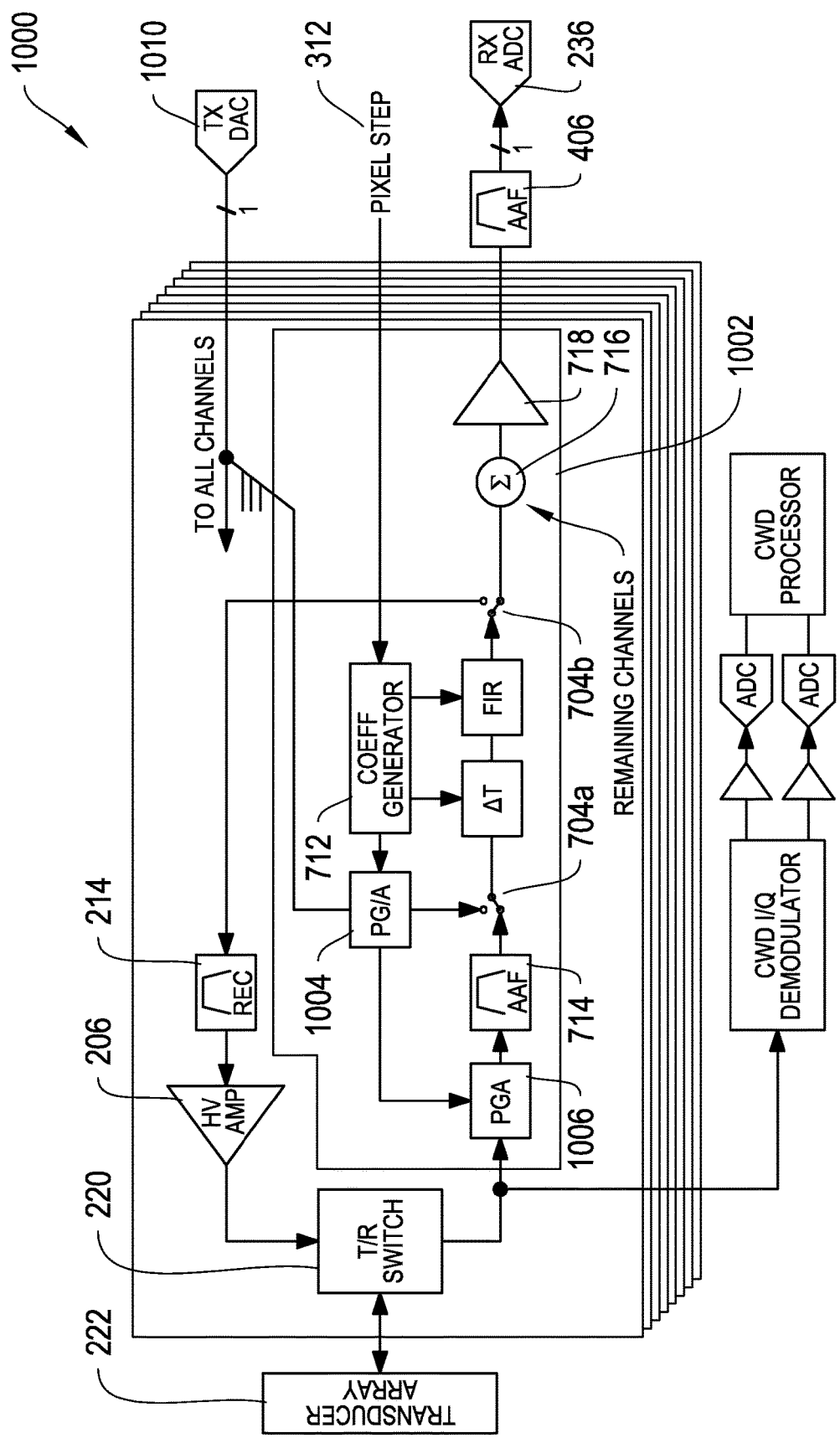
FIG. 10 is a diagram illustrating another ultrasound beamforming architecture having a transmit DAC, according to some embodiments of the disclosure.
Figure 11:
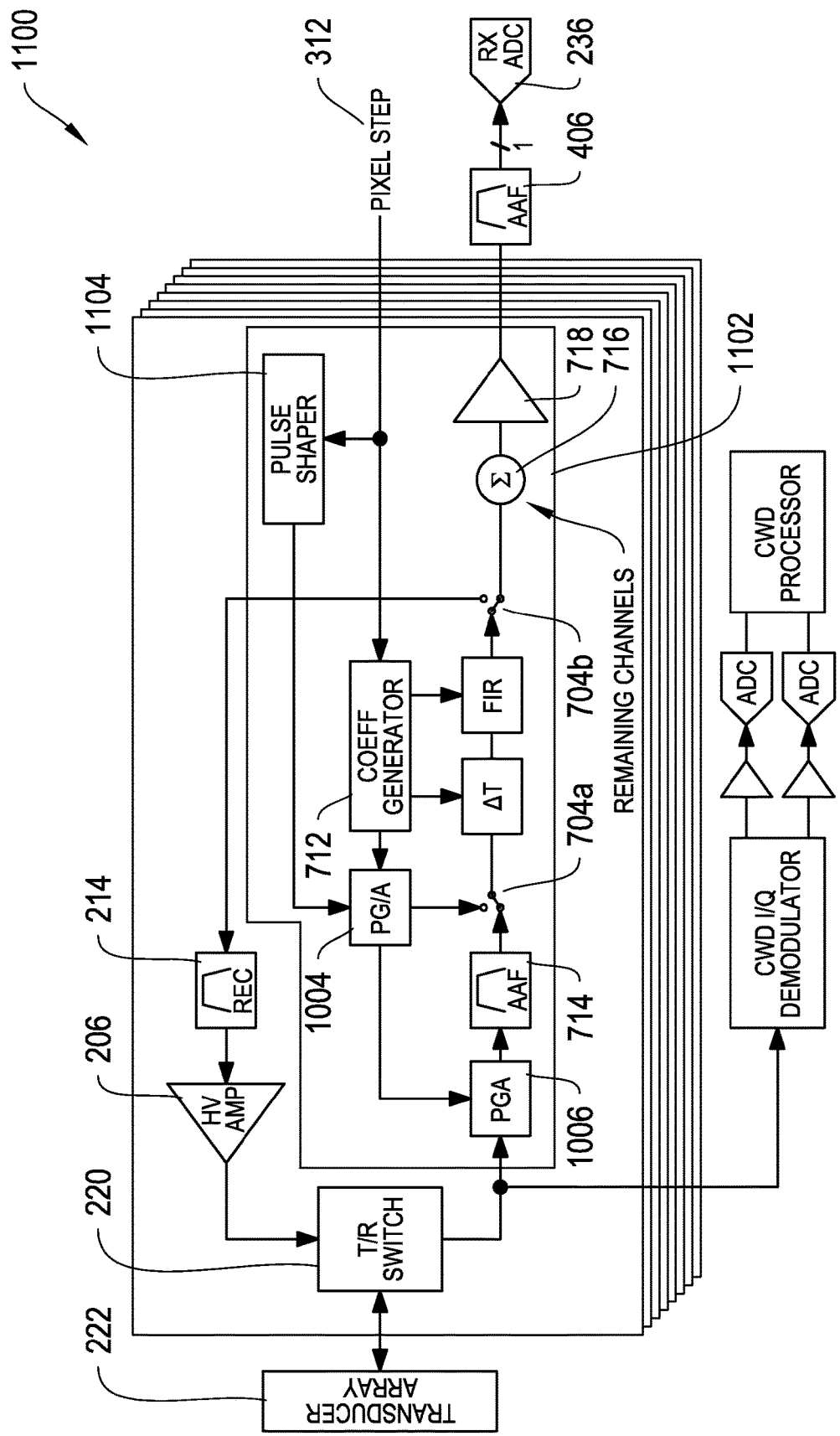
FIG. 11 is a diagram illustrating another ultrasound beamforming architecture having an integrated pulse shaper, according to some embodiments of the disclosure.

FIG. 10 is a diagram illustrating another ultrasound beamforming architecture 1000 having a transmit DAC 1010 and a pixel step 312, according to some embodiments of the disclosure. The sampled analog beamforming architecture 1002 shown in FIG. 10 includes a first PGA 1004 positioned before the switch 704a and a second PGA 1006 positioned before the AAF 714. According to some examples, the PGA 1006 is implemented as an amplifier with filtering to reduce the fundamental amplitude while simultaneously amplifying the overall signal. This is discussed in further detail below with respect to FIG. 12. FIG. 11 is a diagram illustrating an ultrasound beamforming architecture 1100 similar to that shown in FIG. 10, but having an integrated pulse shaper 1104 according to some embodiments of the disclosure. The input to the pulse shaper 1102 is derived from the pixel step 312 signal.

Figure 12:
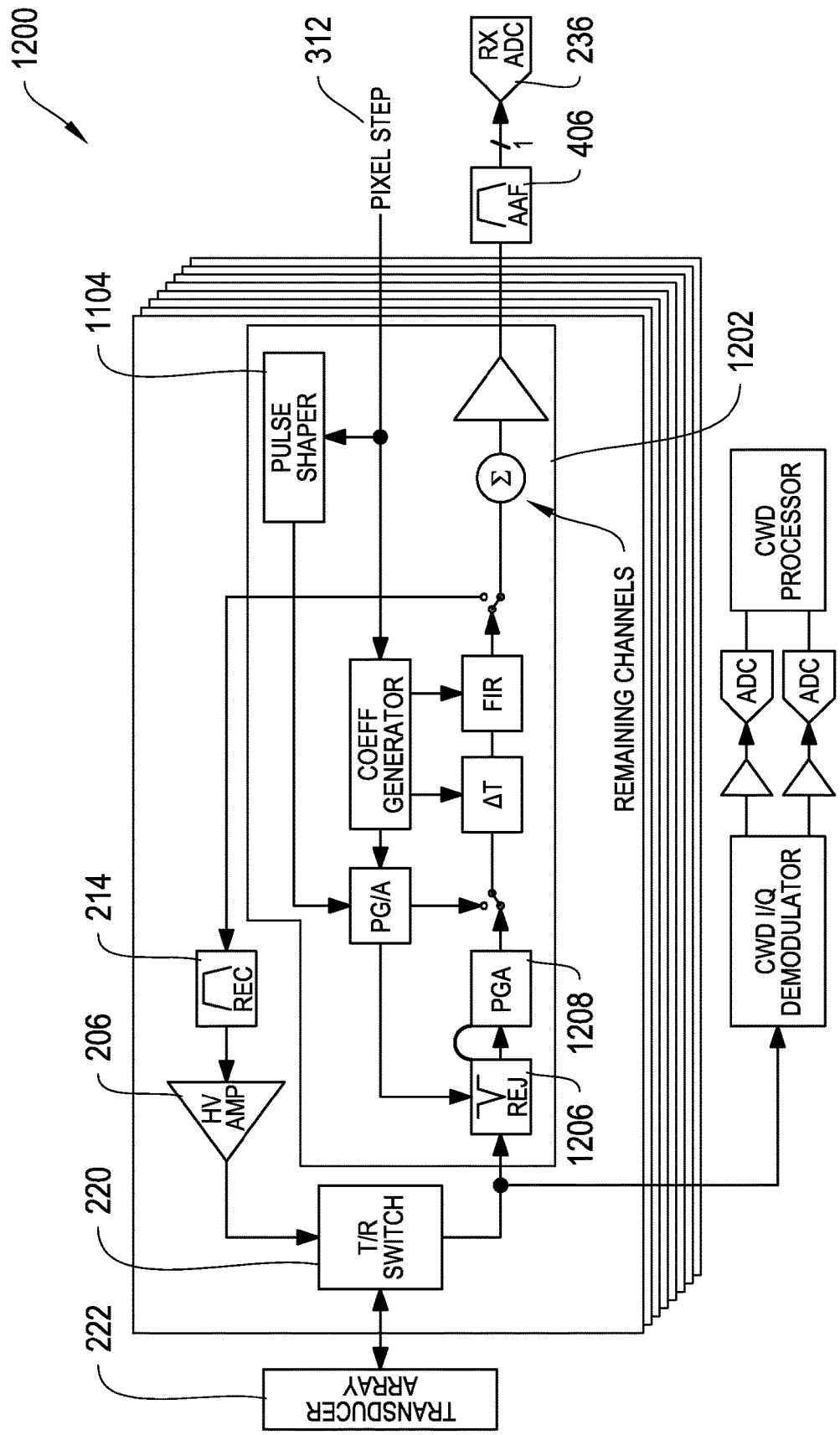
FIG. 12 is a diagram illustrating an ultrasound beamforming architecture having a reject filter, according to some embodiments of the disclosure.

FIG. 12 is a diagram illustrating an ultrasound beamforming architecture having a reject (REJ) filter 1206, according to some embodiments of the disclosure. The sampled analog beamforming architecture 1202 includes a REJ filter 1206, which reduces the fundamental amplitude simultaneously amplifying the entire signal. The REJ filter 1206 may be a SA FIR filter. In various implementations, the REJ filter 1206 may be the filter 1300 shown in FIG. 13 or the filter 1400 shown in FIG. 14, and discussed below. The REJ filter 1206 can be used for harmonic imaging. In one example, the echo received at the second harmonic of the transmit signal is used to construct the image and the fundamental frequency of the transmitted signal is rejected. In this operation the fundamental amplitude is not used and is large which limits the gain of the PGA 1208 coupled to the REJ filter 1206.

Figure 13:
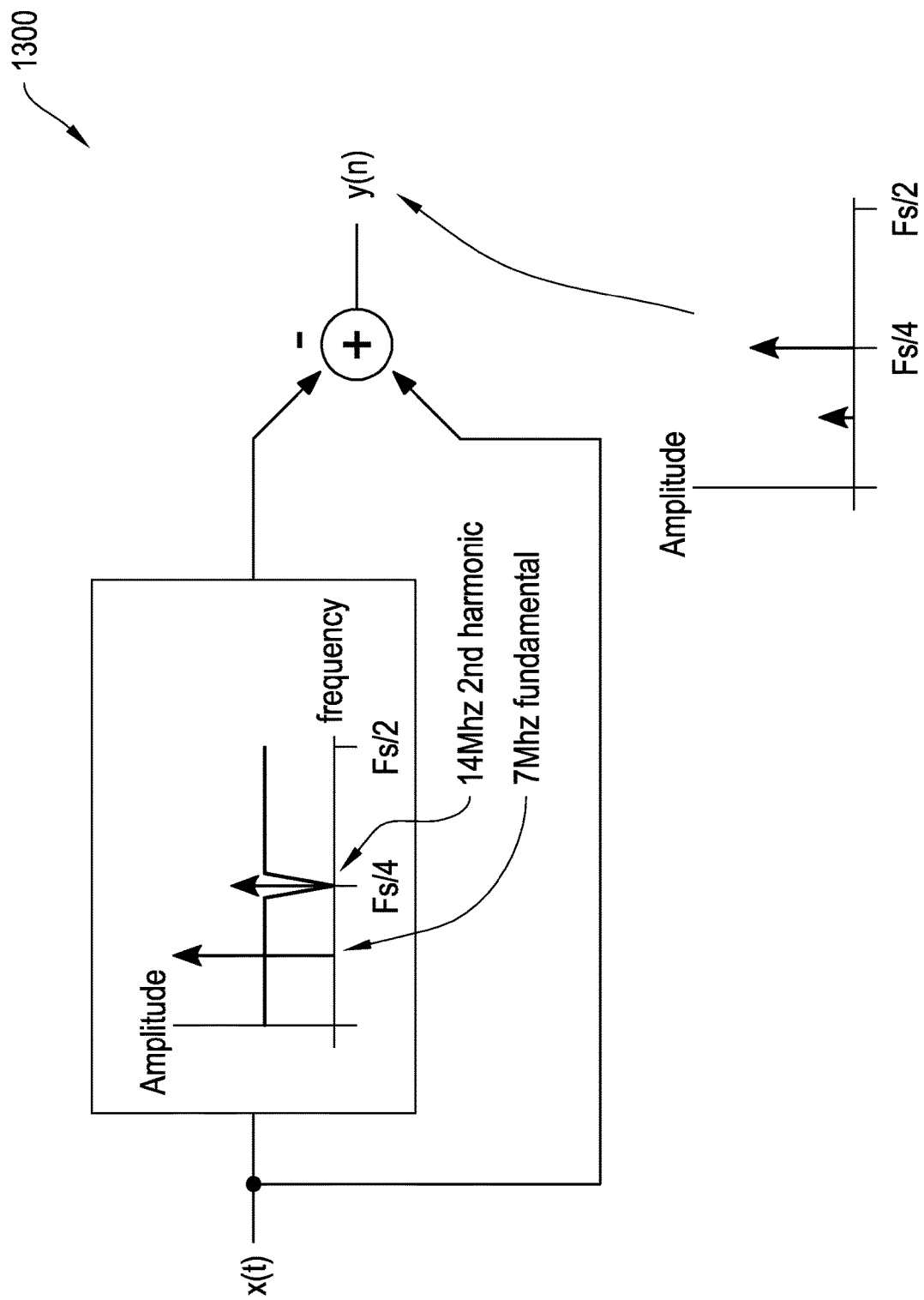
FIG. 13 is a diagram illustrating an SAT FIR filter architecture, according to some embodiments of the disclosure.

FIG. 13 is a diagram illustrating a first SAT FIR filter architecture 1300, according to some embodiments of the disclosure. The SAT FIR filter architecture 1300 can be used to implement the REJ filter 1206 shown in FIG. 12. According to one example, if the input signal is sampled at a rate equal to the second harmonic frequency, then the second harmonic signal is downconverted to dc. According to one implementation, the notch filter can be replaced with a low pass filter and all of the subsequent signal processing can be done at baseband.

Figure 14:
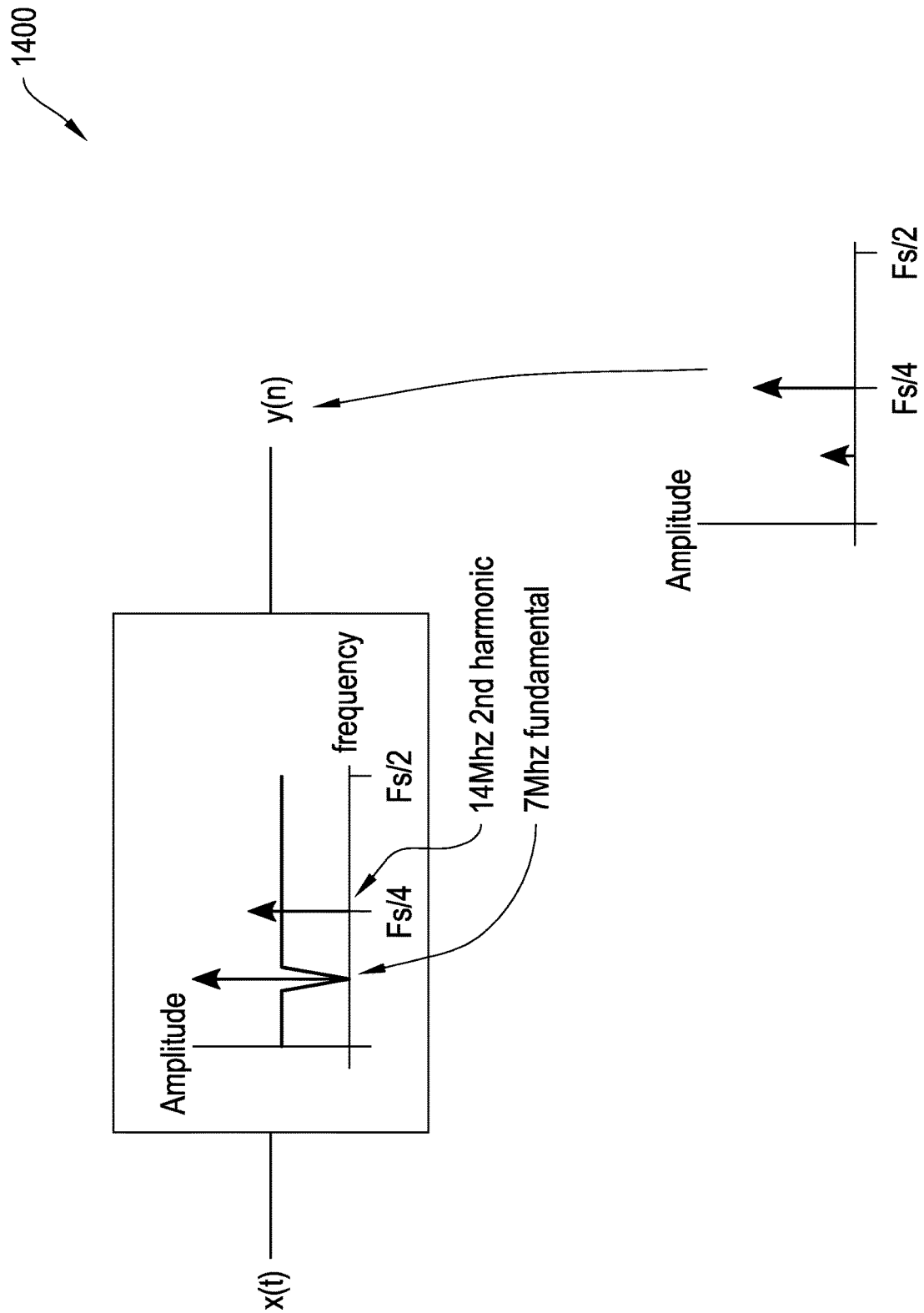
FIG. 14 is a diagram illustrating another SAT FIR filter architecture, according to some embodiments of the disclosure.

FIG. 14 is a diagram illustrating a second SAT FIR filter architecture 1400, according to some embodiments of the disclosure. The SAT FIR filter architecture 1400 can be used to implement the REJ filter 1206 shown in FIG. 12. Referring back to FIG. 12, according to one implementation, the REJ filter 1206 is a SAT FIR filter, a clock is used to generate bang-bang pulses (2 or 3 pulses at some fundamental frequency usually), and the clock can be used to control the SAT FIR filter too. The clock can synchronously control both the bang-bang pulses and the SAT FIR filter. Thus, the filter can perfectly reject the fundamental. The rejection is by subtraction. In other implementations, a direct fundamental filter can be used, in which there is a single filter path and the filter acts like a notch filter at fundamental frequency.

In another implementation, instead of the REJ filter 1206, a demodulator and filter are used in an ultrasound beamforming architecture. The architecture can include a mixer clock, which may come from a clock generator block. The mixing function may also be performed as part of the sampling process. In one example, by synchronizing the sampling clock to the frequency of the desired harmonic signal, the desired harmonic is demodulated to dc or a low intermediate frequency and is selected by the filter.

As shown in the figures above, many variations to the ultrasound beamforming architecture including sampled analog beamforming are possible. Some of these variations are discussed in further detail below. On the transmission path, the linear amplifier may be an amplifier external to the chip, or it may be an amplifier built into the chip. In some examples, a digital pre-distortion (DPD) can be added to the amplifier chain for amplifier linearization. DPD is used to improve the linearity of the transmitted signal. According to one example, DPD improves the linearity of the transmitted signal through knowledge of the non-linearities of the transmit path chain. DPD predistorts the signal in the digital domain in a manner that compensates for non-linearities in the analog domain.

As discussed above, FIGS. 5-9 include a VCO amplifier. According to some implementations, a VCO can be used to generate a pulse, and a ramp DAC is coupled to the VCO. The delay in the signal transmission when the VCO is used to generate the pulse is linked to the ramp DAC.

Several different beamforming filter structures can be used in implementing a sampled analog beamformer, as discussed above. In some implementations, a farrow type structure can be used, with alternative FIR based phase shifters. In other implementations, for a lower power, lower resolution and lower cost beamforming solution, a skewed sample structure can be used. The sampling rate can be changed, and in some examples, the sampling rate is increased to a rate such that no interpolation between samples is used. In some examples, when the sampling rate is 16 times the transducer center frequency, or higher than 16 times the transducer center frequency, no interpolation is used. When the sampling rate is increased such that no interpolation is used, then no fractional delay filter is used and the interpolator output selects the correct nearest sample. In one example, the interpolator selects which sub-sample of the output samples to use for the fractional delay component of the delay profile.

Figure 15A:
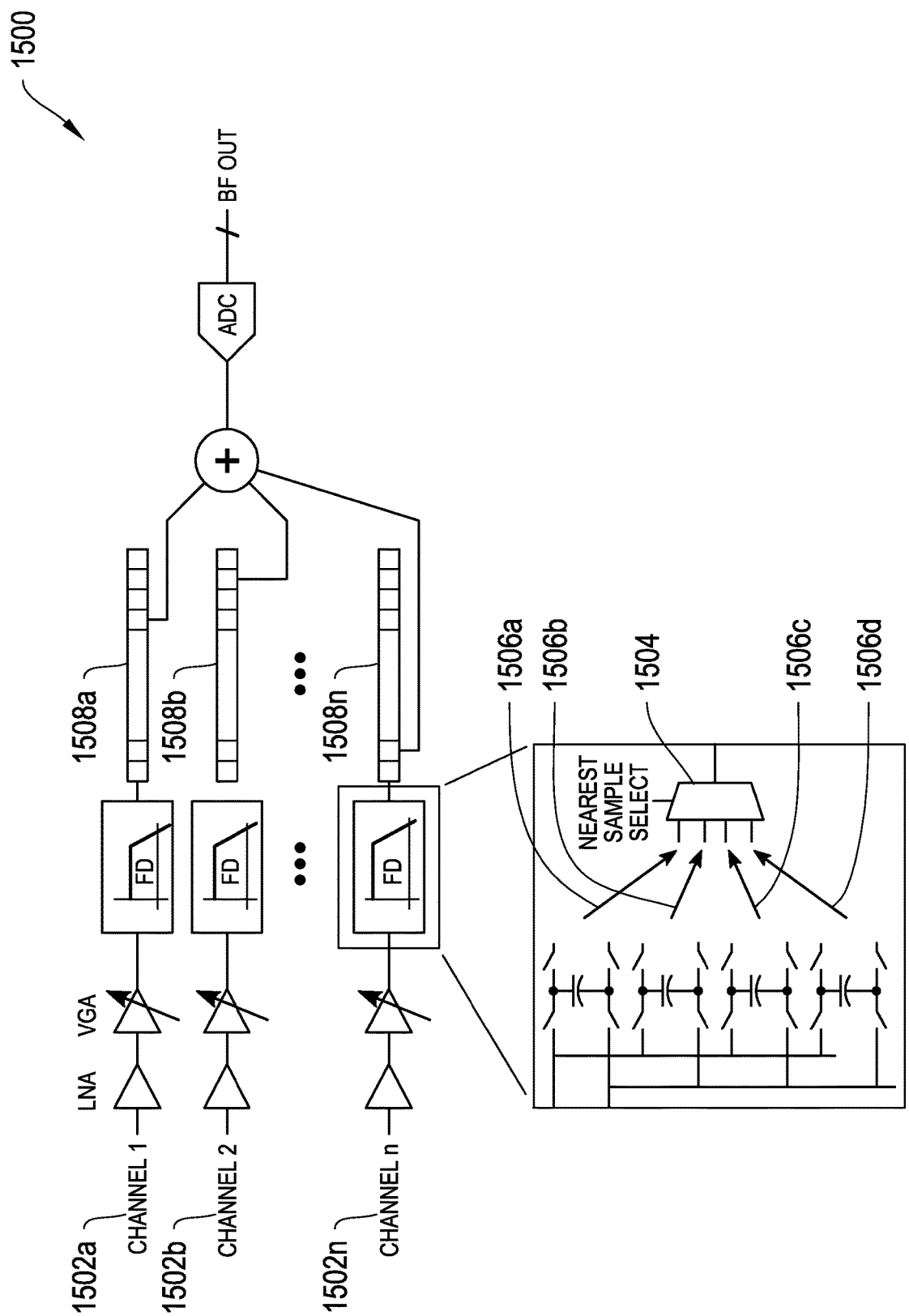
FIGS. 15A-15B show diagrams illustrating skewed sampling, according to one some embodiments of the disclosure.

FIG. 15A shows a diagram 1500 illustrating skewed sampling, according to one implementation. In FIG. 15A, the input sample rate is 4× the output rate and the interpolator 1504 selects which of the 4 sub-samples 1506a-1506d to use as the input to the integer delay line 1506n. The channels 1502a-1502n look the same and the sub-sampling caps are sampled simultaneously for the channels 1502a-1502n. This reduces the interpolation block error.

Figure 15B:
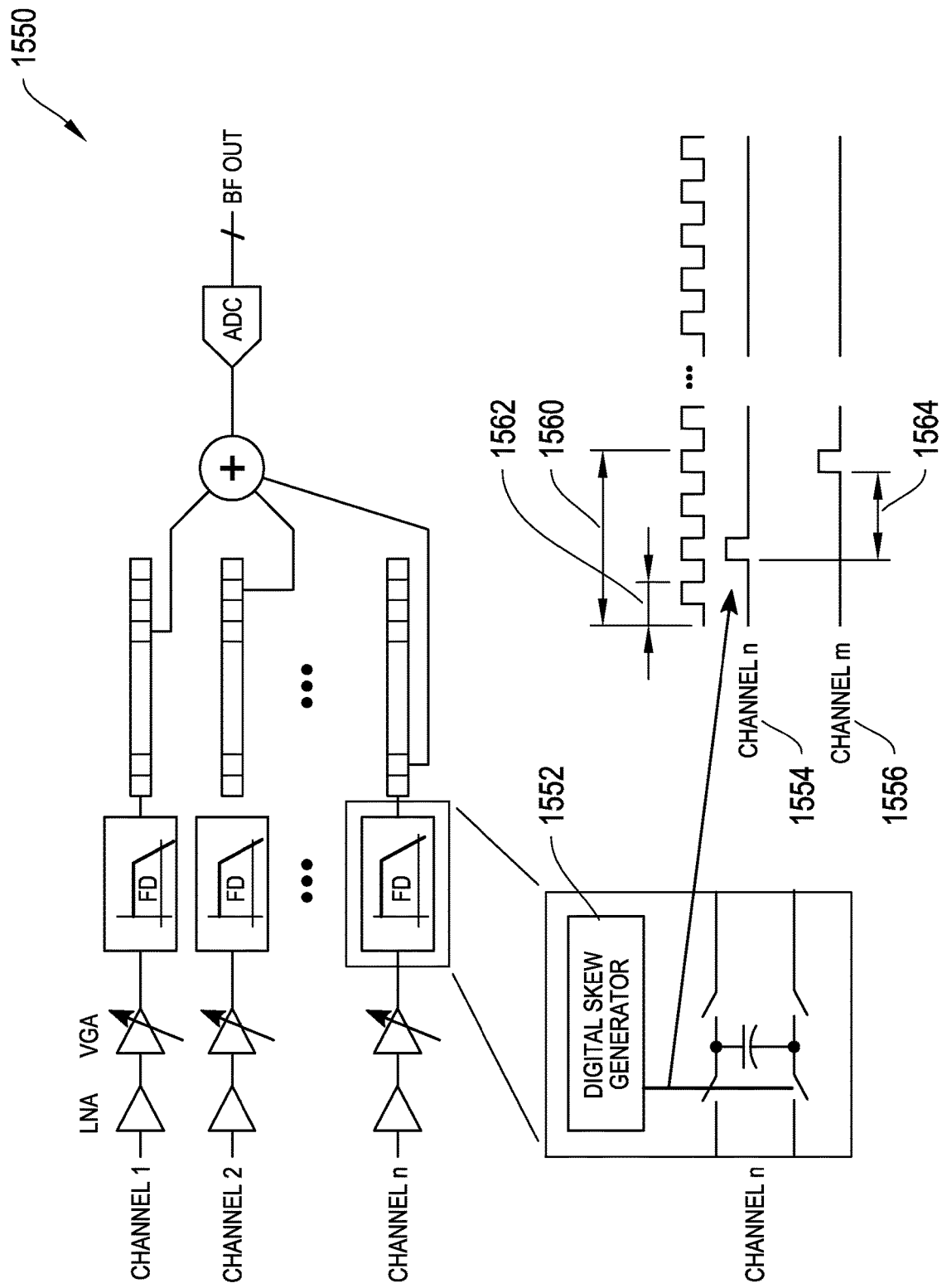

FIG. 15B shows a diagram 1550 illustrating skewed sampling including a digital block 1552 for sub-sampling and nearest sample selection. The time skew of delay between channels that comprise the delay profile is generated inside the digital block 1552 using a high frequency clock input. In one example, the sample rate is 1560, the up-sampled rate is 1562, and the digital block 1552 generates the time skew 1564 between channel n 1554 and channel m 1556. According to one implementation, for skewed sampling using a digital block, input samples for each channel are not simultaneously sampled. Each channel has its own sampling strobe that is moved within the output sample rate (sampling rate/transducer center frequency ratio), and the strobes are generated with different digital delays inside the digital block. The digital delays vary considerably over process, voltage and temperature.

In further implementations, micro beamforming can be used for a fine delay. Additionally, traditional beamforming and delay sum forming can be used. With traditional beamforming, the course delay can be implemented as either a cap delay in front of the fine delay by using a farrow structure, or the course delay can be implemented as a cap delay behind the fine delay using a farrow structure or a skewed sample structure. Other implementations include an ADC followed by a digital course delay, and a digital course delay expanded with an interpolation filter for a finer adjustment.

In some embodiments, some elements may be added post beamforming. For example, a buffer may be added, which may be useful for in-probe receive beamforming. An ADC with digital output (such as LVDS) can be added, which may reduce the amount of cable used between the probe and the base station. Another implementation includes staged beamforming, with multiple stages of the course analog and/or digital delay chains for even higher channel compression.

Various implementations can include sweeping variants. For example, utilizing SAT an add-on having an in-circuit sweeper for supporting B mode, can be constructed. This allows simpler cross device synchronization and allows a simple method for sweeping the front-end using a single step signal vs. programming busses. In some examples, it may allow faster sweeping than traditional methods, especially if combined with TX. In some examples, the sweeper is a fixed hardware function that based on known sensor location will sweep through a pre-determined coefficient set. In other examples, a programmable storage option can be preprogrammed for a given sweep pattern. The storage can be on-chip RAM, off-chip RAM, NVM, on-chip OTP, or pre-programmed ROM.

In some implementations, the architectures disclosed herein could be used for radar signals instead of ultrasound signals.

VARIATIONS AND IMPLEMENTATIONS

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to circuit architectures, illustrate only some of the possible circuit architecture functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A system for analog beamforming configured to be housed inside an ultrasound probe, comprising:
    an array of ultrasound transducers configured for receiving a reflected analog ultrasound signal and providing an analog output;
    an array of receive beamforming circuits coupled to the array of ultrasound transducers, wherein each receive beamforming circuit of the array of receive beamforming circuits is configured to receive the analog output, sample the analog output, and produce a filtered analog signal, and each receive beamforming circuit comprises:
    an anti-aliasing filter,
    a first delay filter configured to add a first delay to the analog output, the first delay dependent on the position of the first delay filter in the array, and
    a finite impulse response (FIR) filter; and
    a summation node configured to add the filtered analog signals in parallel.

2. The system of claim 1, wherein the first delay filter is a farrow filter and the first delay is a fractional delay.

3. The system of claim 2, further comprising a coefficient generator for updating the fractional delay.

4. The system of claim 3, wherein the coefficient generator updates the fractional delay based on a target of an ultrasound focus beam.

5. The system of claim 1, wherein the the first delay filter is a sampled analog filter and the first delay is a fractional delay.

6. The system of claim 1, wherein the the first delay filter is a skewed delay filter introducing the delay to the reflected analog ultrasound signal.

7. The system of claim 1, wherein the the first delay filter includes a fractional delay filter bank.

8. The system of claim 1, wherein the anti-aliasing filter is configured to filter out aliases.

9. The system of claim 1, wherein the array of transducers is further configured to transmit a filtered analog ultrasound signal.

10. The system of claim 1, further comprising a high voltage amplifier coupled to the array of receive beamforming circuits and the array of ultrasound transducers configured to drive transducers in the array of ultrasound transducers.

11. A analog beamforming system for giving the appearance of a virtual microphone in an analog domain and for tracking or focusing an object in an ultrasound image, the analog beamforming system comprising:

an array of ultrasonic transducers configured for receiving a reflected analog ultrasonic signal and providing an analog output;

an array of receive beamforming circuits coupled to the array of ultrasonic transducers, each circuit configured to receive the analog output, sample the analog output, and produce a filtered analog signal and comprising:
an anti-aliasing filter,
a first delay filter configured to add a first delay to the analog output, the first delay dependent on the position of the respective circuit in the array, and
a finite impulse response (FIR) filter.

12. The system of claim 1, wherein the FIR filter is a switched capacitor filter.

13. The system of claim 11, further comprising a summation node configured to add, in parallel, the filtered analog signal output from each of the array of receive beamforming circuits.

14. The system of claim 11, wherein each of the array of receive beamforming circuits is configured to produce spatial samples of the analog outputs, and wherein the filtered analog signal comprises the spatial samples.

15. A method for discrete time analog beamforming used to track or focus an object in an ultrasound image, the method comprising:
receiving an array of reflected analog ultrasonic signals;
transducing the array of reflected analog ultrasonic signals into an array of electrical analog signals;
parallel processing each of the array of electrical analog signals to produce a plurality of parallel processed sampled signals, the parallel processing comprising:
filtering each of the array of electrical analog signals using an anti-aliasing filter and outputting an array of filtered electrical analog signals,
delaying each of the array of filtered electrical analog signals by a predetermined time dependent on its disposition in the array and outputting an array of delayed electrical analog signals, and
filtering each of the array delayed electrical analog signals using a finite impulse response (FIR) filter and outputting sampled signals; and,
summing the parallel processed sampled signals.

16. The method of claim 15, wherein parallel processing each of the array of electrical analog signals includes taking a discrete time spatial sample of each of the array of electrical analog signals.

17. The method of claim 15, wherein parallel processing includes amplifying each of the array of electrical analog signals.

18. The method of claim 15, further comprising determining the predetermined time for delaying each of the array of filtered electrical analog signals at a coefficient generator.

19. The method of claim 18, wherein determining the predetermined time for delaying each of the array of filtered electrical analog signals is based on a target of an ultrasound focus beam.

20. A apparatus for discrete time analog beamforming used to track or focus an object in an ultrasound image, the apparatus comprising:
means for receiving an array of reflected analog ultrasonic signals;
means for transducing the array of reflected analog ultrasonic signals into an array of electrical analog signals;
means for parallel processing each of the array of electrical analog signals including taking a discrete time spatial sample of each in the array of electrical analog signals, the parallel processing comprising:
means filtering each of the array of electrical analog signals using an anti-aliasing filter and outputting an array of filtered electrical analog signals,
means for delaying each of the array of filtered electrical analog signals by a selected time dependent on its disposition in the array and outputting an array of delayed electrical analog signals, and
means for filtering each of the array of delayed electrical analog signals using a finite impulse response (FIR) filter.

21. The apparatus of claim 20, wherein the means for parallel processing each of the array of electrical analog signals outputs a respective parallel processed signal for each of the array of electrical analog signals, and further comprising means for summing the parallel processed signals.

22. The apparatus of claim 20, wherein the means for parallel processing further comprises means for amplifying each of the array of electrical analog signals.

* * * * *